(12) United States Patent
Ding et al.

(10) Patent No.: US 8,989,293 B2
(45) Date of Patent: Mar. 24, 2015

(54) JOINT CODING METHOD BASED ON BINARY TREE AND CODER

(75) Inventors: Ming Ding, Shanghai (CN); Renmao Liu, Shanghai (CN); Zeng Yang, Shanghai (CN); Yongming Liang, Shanghai (CN); Yingyu Zhang, Shanghai (CN)

(73) Assignee: Sharp Kabushiki Kaisha, Osaka (JP)

( * ) Notice: Subject to any disclaimer, the term of this patent is extended or adjusted under 35 U.S.C. 154(b) by 140 days.

(21) Appl. No.: 13/698,372

(22) PCT Filed: Sep. 1, 2011

(86) PCT No.: PCT/JP2011/070416
§ 371 (c)(1),
(2), (4) Date: Nov. 16, 2012

(87) PCT Pub. No.: WO2012/029989
PCT Pub. Date: Mar. 8, 2012

(65) Prior Publication Data
US 2013/0077704 A1     Mar. 28, 2013

(30) Foreign Application Priority Data

Sep. 1, 2010   (CN) .......................... 2010 1 0268688

(51) Int. Cl.
*H04B 7/02*    (2006.01)
*H04B 7/04*    (2006.01)
*H04L 25/03*   (2006.01)

(52) U.S. Cl.
CPC ........ *H04B 7/0486* (2013.01); *H04L 25/03898* (2013.01)
USPC ...................................................... 375/267

(58) Field of Classification Search
CPC ............ H04L 25/03898; H03M 13/00; H04B 7/0486; H04B 7/0456; H04B 7/0478; H04B 7/0639

USPC .......... 375/260, 265, 267, 285, 295; 714/786, 714/792

See application file for complete search history.

(56) References Cited

U.S. PATENT DOCUMENTS

2009/0046569 A1* 2/2009 Chen et al. .................... 370/203
2010/0232539 A1* 9/2010 Han et al. ...................... 375/285

(Continued)

OTHER PUBLICATIONS

3GPP TS 36.213 V9.1.0, "Physical Layer Procedures", Mar. 2010, pp. 1-79.

(Continued)

*Primary Examiner* — Khanh C Tran
(74) *Attorney, Agent, or Firm* — Birch, Stewart, Kolasch & Birch, LLP

(57) ABSTRACT

The present invention provides a method and a coder for jointly coding Pre-coding Matrix Index #1 (W1) and Rank Index (RI) for channel state information feedback of a double codebook precoding frame. In the present invention, it is determined whether Rank Index RI is more than 2; if the RI is no more than 2, a first half branch of a coding binary tree is used to represent joint coding of the RI and W1 when RI=1 and RI=2; if the RI is more than 2, a second half branch of the coding binary tree is used to represent remaining separate codings and/or joint codings when the RI is more than 2; and processing results of the above coding steps are output. The present invention may be applied to an equal-length coding or an unequal-length coding. The present invention has advantages such as easy implementation, lower signaling overhead etc., and may be suitable for an LTE-A/4G cellular communication system and a future 5G cellular communication system.

13 Claims, 13 Drawing Sheets

(56) References Cited

U.S. PATENT DOCUMENTS

| | | | |
|---|---|---|---|
| 2012/0008585 A1* | 1/2012 | Kwon et al. | 370/329 |
| 2012/0314590 A1* | 12/2012 | Choudhury et al. | 370/252 |
| 2012/0328035 A1* | 12/2012 | Yoon et al. | 375/260 |
| 2013/0077660 A1* | 3/2013 | Ko et al. | 375/219 |
| 2013/0088981 A1* | 4/2013 | Lv et al. | 370/252 |

OTHER PUBLICATIONS

Alcatel-Lucent, et al., "Way-Forward on 8Tx Codebook for Rel.10 DL MIMO", 3GPP TSG RAN WG1 #62, R1-105011, Madrid, Spain, Aug. 23-27, 2010.

Alcatel-Lucent, et al., "Way-Forward on CSI Feedback Design for Rel-10 DL MIMO", 3GPP TSG RAN WG1 #61, R1-103419, Montreal, Canada, May 10-14, 2010.

Alcatel-Lucent, et al., "WF on Aperiodic PUSCH CQI Modes in Rel.10", 3GPP TSG RAN WG1 #62, R1-105010, Madrid, Spain, Aug. 23-27, 2010.

International Search Report issued in PCT/JP2011/070416, dated Nov. 1, 2011.

MCC Support, "Final Report of 3GPP TSG RAN WG1 #58bis v1.0. 0", 3GPP TSG RAN WG1 #59, R1-094421, Jeju, South Korea, Nov. 9-13, 2009.

RAN WG1, "Way Forward on Rel. 10 Feedback", 3GPP TSG RAN WG1 meeting #60bis, R1-102579, Beijing, China, Apr. 12-16, 2010.

Texas Instruments, "Progressing on CSI Feedback Design for Rel.10 Downlink MIMO", 3GPP TSG RAN WG1 #62, R1-104475, Madrid, Spain, Aug. 23-27, 2010, pp. 1-4.

Texas Instruments, et al., "Way Forward on CSI Feedback for Rel.10 DL MIMO", 3GPP TSG RAN WG1 #61b, R1-104234, Dresden, Germany, Jun. 28-Jul. 2, 2010.

ZTE, "Consideration on Signaling for Two-Component Feedback", 3GPP TSG RAN WG1 meeting #62, R1-104558, Madrid, Spain, Aug. 23-27, 2010.

* cited by examiner

F I G. 4
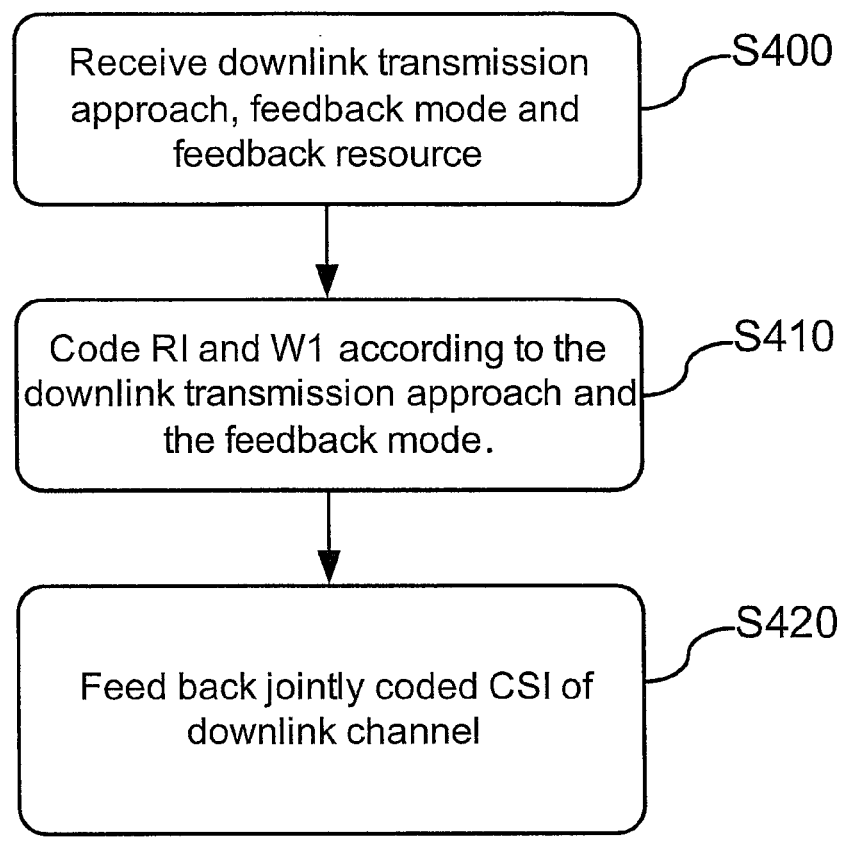

F I G. 6
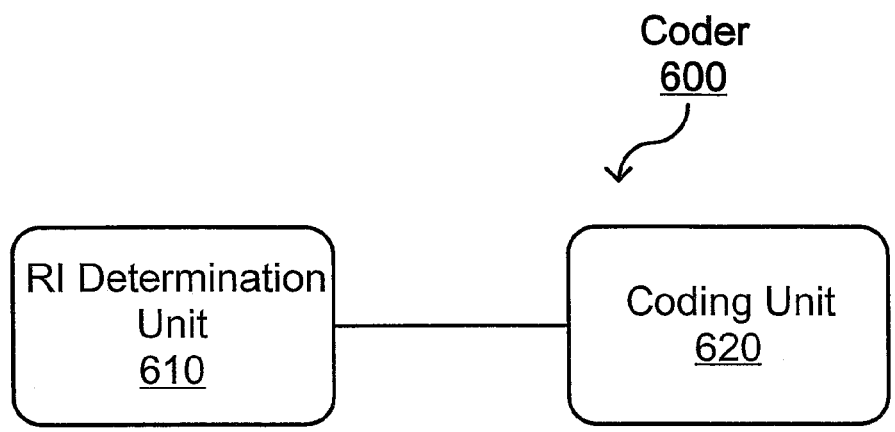

F I G. 1 3
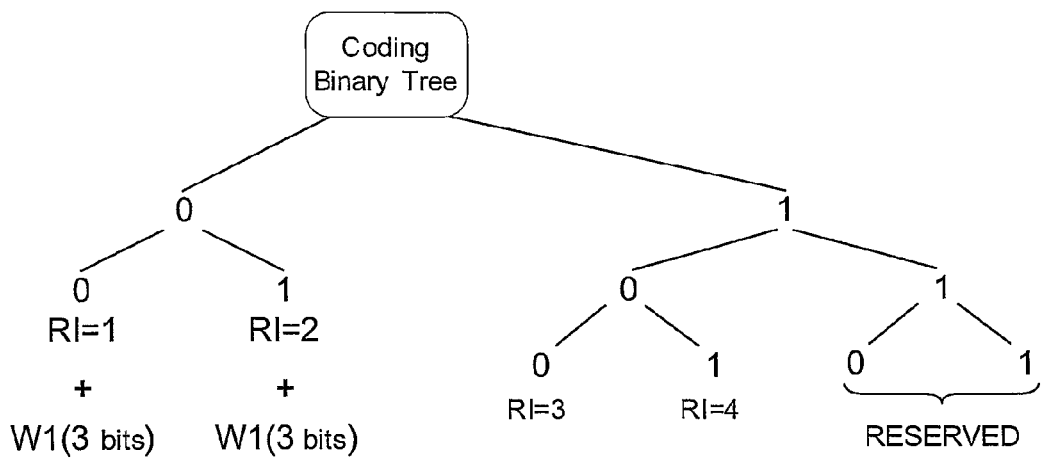
F I G. 1 4
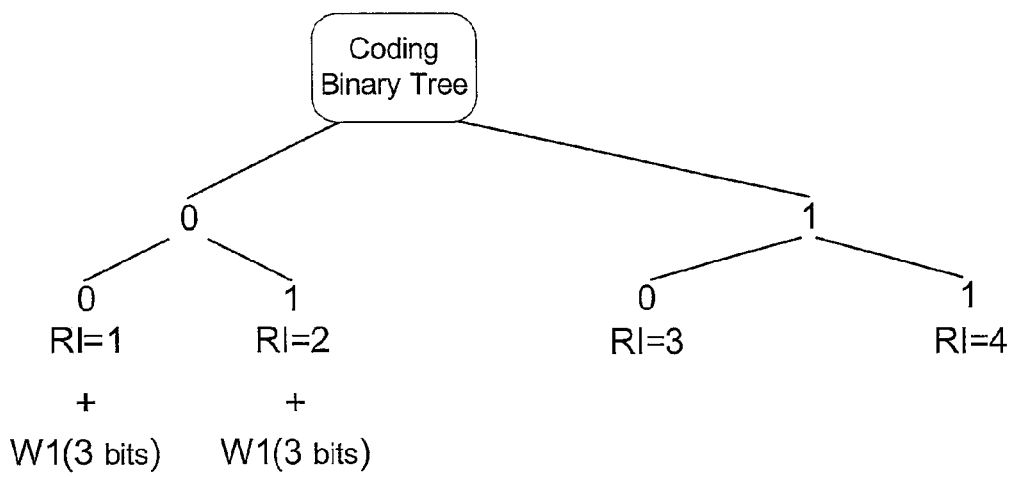

F I G. 1 5
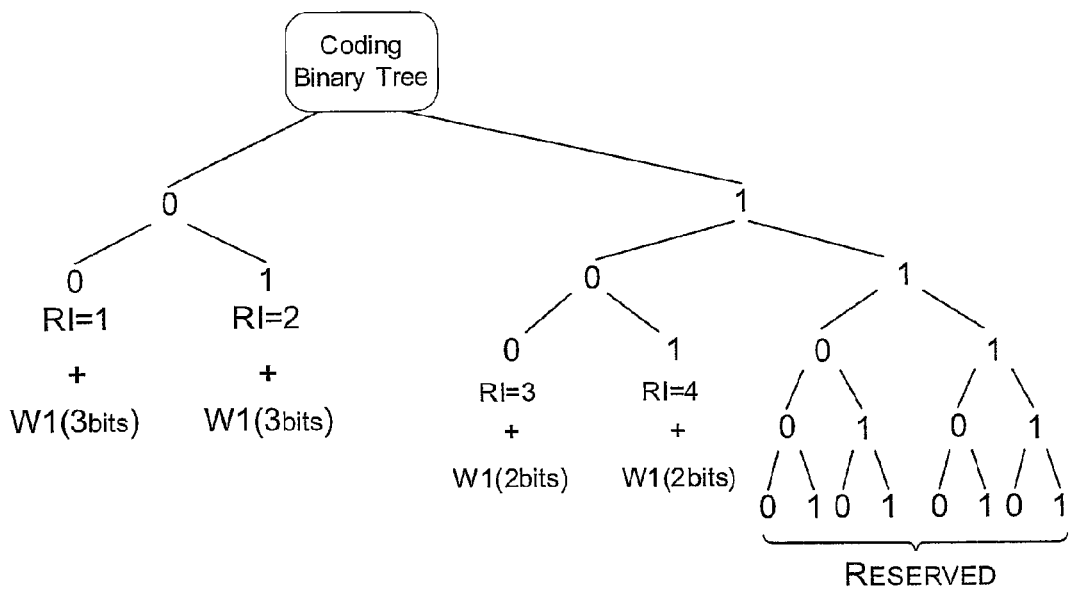
F I G. 1 6
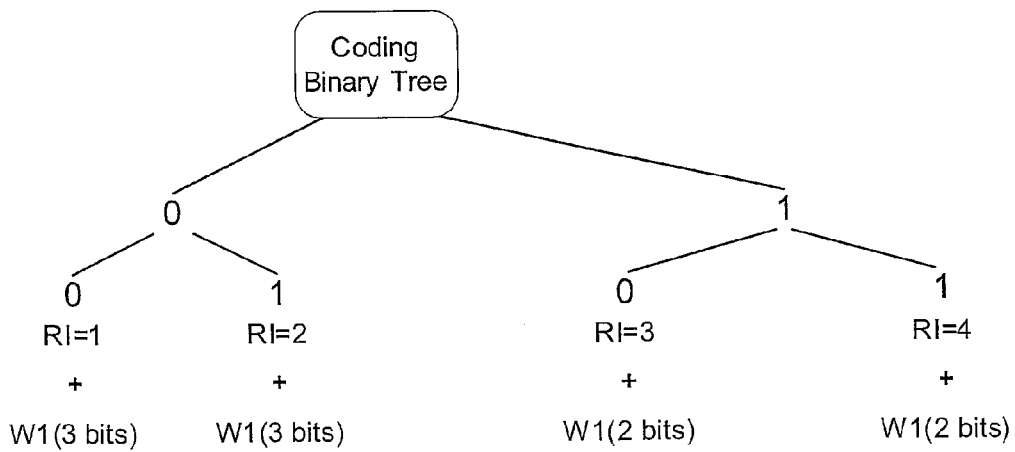

JOINT CODING METHOD BASED ON BINARY TREE AND CODER

TECHNICAL FIELD

The invention relates to a communication technology field, and more particularly, to a technique of jointly coding downlink Channel State Information (CSI) by a user equipment (UE) based on a binary tree in a cell of a multi-antenna multi-carrier base station (BS) and feeding it back to the base station.

BACKGROUND ART

A multi-antenna (MIMO: Multiple In Multiple Out) wireless transmission technique can achieve a spatial multiplex gain and a spatial diversity gain by deploying a plurality of antennas at both a transmitter and a receiver and utilizing spatial resources in the wireless transmission. Researches on information theory have shown that capacity of a MIMO system grows linearly with the minimum of the number of transmitting antennas and the number of receiving antennas.

FIG. 1 shows a schematic diagram of a MIMO system. As shown in FIG. 1, the plurality of antennas at the transmitter and the plurality of antennas at each of the receivers constitute multi-antenna wireless channels containing spatial domain information. Further, Orthogonal Frequency Division Multiplexing (OFDM) technique has a strong anti-fading capability and high frequency utilization and is thus suitable for high speed data transmission in a multi-path environment and a fading environment. A MIMO-OFDM technique, in which MIMO and OFDM are combined, has become a core technique for the next generation mobile communication.

For instance, the $3^{rd}$ Generation Partnership Project (3GPP) organization is an international organization in the mobile communication field which plays an important role in standardization of 3G cellular communication technologies. Since the second half of the year 2004, the 3GPP organization has initiated a so-called Long Term Evolution (LTE) project for designing Evolved Universal Terrestrial Radio Access (EUTRA) and Evolved Universal Terrestrial Radio Access Network (EUTRAN). The MIMO-OFDM technique is employed in the downlink of the LTE system. In a conference held in Shenzhen, China in April 2008, the 3GPP organization started a discussion on the standardization of 4G cellular communication systems (currently referred to as LTE-A systems). Again, the MIMO-OFDM technique becomes a key technique for air interface in the LTE-A system.

In the LTE-A system, Carrier Aggregation (CA) is a new concept. FIG. 2 illustrates the CA concept in which a base station is provided with a plurality of downlink carriers and a plurality of uplink carriers. A number of carriers can be virtually combined into one carrier, which is referred to as carrier aggregation. The LTE-A system can support continuous CA as well as intra-band or inter-band non-continuous CA, with a maximum aggregated bandwidth of 100 MHz. In order to ensure effective utilization of the carriers at the initial stage of the commercial deployment of the LTE-A system, i.e., to ensure that LTE UEs can access the LTE-A system, each carrier should be configured to be backward compatible with the LTE system. However, it is also possible to design a carrier dedicated to the LTE-A system. At the research stage of the LTE-A system, related researches on CA focus on improvement of spectral utilization for continuous CA, design of control channels for asymmetric uplink/downlink CA scenario, and the like. Herein, the design of control channels involves feedback of downlink CSI from a UE to a BS.

There are two feedback channels for downlink CSI feedback in the LTE system, a Physical Uplink Control CHannel (PUCCH) and a Physical Uplink Shared CHannel (PUSCH). In general, the PUCCH is configured for transmission of synchronized, basic CSI with low payload; while PUSCH is configured for transmission of bursty, extended CSI with high payload. For the PUCCH, a complete CSI is composed of different feedback contents which are transmitted in different sub-frames. For the PUSCH, on the other hand, a complete CSI is transmitted within one sub-frame. Such design principles remain applicable in the LET-A system.

The feedback contents can be divided into three categories: Channel Quality Index (CQI), Pre-coding Matrix Index (PMI) and Rank Index (RI), all of which are bit quantized feedbacks. In the LTE-A system, these three categories of contents are still the primary feedback contents. For PMI, it is currently agreed that a PMI is collectively determined from two pre-coding matrix indices #1 and #2 (W1 and W2), where W1 represents broadband/long-term channel characteristics and W2 represents sub-band/short-term channel characteristics. In transmission of W1 and W2 over the PUCCH, it is not necessary for simultaneous feedback of W1 and W2 within the same sub-frame. Moreover, W1 or W2 may be omitted in the feedback. This is described in 3GPP R1-102579, "Way forward on Rel. 10 feedback".

All of frequency ranges corresponding to the CSI feedback are referred to as Set S. In the LTE system where there are only single-carrier situations, the Set S is defined as equal to the carrier bandwidth of the system. In the LTE-A system where there are additionally multi-carrier situations, the Set S may be defined as equal to the bandwidth of one single carrier or equal to a sum of bandwidths of multiple carriers.

In the LTE system, the following eight MIMO transmission approaches for downlink data are defined:

1) Single antenna transmission. This is used for signal transmission at a single antenna BS. This approach is a special instance of MIMO system and can only transmit a single layer of data.

2) Transmission diversity. In a MIMO system, diversity effects of time and/or frequency can be utilized to transmit signals, so as to improve the reception quality of the signals. This approach can only transmit a single layer of data.

3) Open-loop space division multiplexing. This is a space division multiplexing without the need for PMI feedback from UE.

4) Closed-loop space division multiplexing. This is a space division multiplexing in which PMI feedback from UE is required.

5) Multi-user MIMO. There are multiple UEs simultaneously participating in the downlink communication of the MIMO system.

6) Closed-loop single layer pre-coding. Only one single layer of data is transmitted using the MIMO system. The PMI feedback from UE is required.

7) Beam forming transmission. The beam forming technique is employed in the MIMO system. A dedicated reference signal is used for data demodulation at UE. Only one single layer of data is transmitted using the MIMO system. The PMI feedback from UE is not required.

8) Two-layer beam forming transmission. The UE can be configured to feed back PMI and RI, or not to feed back PMI and RI.

In the LTE-A system, the above eight transmission approaches may be retained and/or canceled, and/or a new transmission approach, dynamic MIMO switching, can be added, by which the BS can dynamically adjust the MIMO mode in which the UE operates.

In order to support the above MIMO transmission approaches, a variety of CSI feedback modes are defined in the LTE system. Each MIMO transmission approach corresponds to a number of CSI feedback modes, as detailed in the following.

There are four CSI feedback modes for the PUCCH, Mode 1-0, Mode 1-1, Mode 2-0 and Mode 2-1. These modes are combination of four feedback types, including:

1) Type 1: one preferred sub-band location in a Band Part (BP, which is a subset of the Set S and has its size dependent on the size of the Set S) and a CQI for the sub-band. The respective overheads are L bits for the sub-band location, 4 bits for the CQI of the first codeword and 3 bits for the CQI of the possible second codeword which is differentially coded with respect to the CQI of the first codeword.

2) Type 2: broadband CQI and PMI. The respective overheads are 4 bits for the CQI of the first codeword, 3 bits for the CQI of the possible second codeword which is differentially coded with respect to the CQI of the first codeword and 1, 2 or 4 bits for PMI depending on the antenna configuration at BS.

3) Type 3: RI. The overhead for RI is 1 bit for two antennas, or 2 bits for four antennas, depending on the antenna configuration at BS.

4) Type 4: broadband CQI. The overhead is constantly 4 bits.

The UE feeds back different information to the BS in correspondence with the above different types.

The Mode 1-0 is a combination of Type 3 and Type 4. That is, the feedbacks of Type 3 and Type 4 are carried out at different periods and/or with different sub-frame offsets. In the Mode 1-0, the broadband CQI of the first codeword in the Set S and possibly the RI information are fed back.

The Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual codewords and possibly the RI information are fed back.

The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back.

The Mode 2-1 is a combination of Type 3, Type 2 and Type 1. That is, the feedbacks of Type 3, Type 2 and Type 1 are carried out at different periods and/or with different sub-frame offsets. In the Mode 2-1, the broadband PMI of the Set S, the broadband CQIs for the individual codewords and possibly the RI information, as well as one preferred sub-band location in the BP and the CQI for the sub-band are fed back.

There are thus the following correspondence between the MIMO transmission approaches and the CSI feedback modes:

MIMO transmission approach 1): Mode 1-0 and Mode 2-0;
MIMO transmission approach 2): Mode 1-0 and Mode 2-0;
MIMO transmission approach 3): Mode 1-0 and Mode 2-0;
MIMO transmission approach 4): Mode 1-1 and Mode 2-1;
MIMO transmission approach 5): Mode 1-1 and Mode 2-1;
MIMO transmission approach 6): Mode 1-1 and Mode 2-1;
MIMO transmission approach 7): Mode 1-0 and Mode 2-0;
MIMO transmission approach 8): Mode 1-1 and Mode 2-1, with PMI/RI feedback from UE; or
Mode 1-0 and Mode 2-0, without PMI/RI feedback from UE.

On the other hand, there are five CSI feedback modes for the PUSCH, Mode 1-2, Mode 3-0, Mode 3-1, Mode 2-0 and Mode 2-2.

In the Mode 1-2, the PMIs of the individual sub-bands in the Set S, the broadband CQIs of the individual sub-bands in the Set S and possibly the RI information are fed back.

In the Mode 3-0, the CQI for the first codeword of each sub-band in the Set S, the broadband CQI of the first codeword in the Set S and possibly the RI information are fed back. Herein, the sub-band CQIs are differentially coded with respect to the broadband CQI, so as to reduce feedback overhead.

In the Mode 3-1, the CQIs for the individual codewords of each sub-band in the Set S, the broadband CQIs of the individual codewords in the Set S, the broadband PMI of the Set S and possibly the RI information are fed back. Herein, the sub-band CQIs are differentially coded with respect to the broadband CQIs, so as to reduce feedback overhead.

In the Mode 2-0, the locations of the preferred M sub-bands in the Set S, the broadband CQI for the first codeword in each of the M sub-bands, the broadband CQI of the first codeword in the Set S and possibly the RI information are fed back.

In the Mode 2-2, the locations of the preferred M sub-bands in the Set S, the broadband PMIs for the M sub-bands, the broadband CQIs for the individual codewords in each of the M sub-bands, the broadband PMI of the Set S, the broadband CQIs of the individual codewords in the Set S and possibly the RI information are fed back.

There are thus the following correspondence between the MIMO transmission approaches and the CSI feedback modes:

MIMO transmission approach 1): Mode 2-0 and Mode 2-0;
MIMO transmission approach 2): Mode 2-0 and Mode 3-0;
MIMO transmission approach 3): Mode 2-0 and Mode 3-0;
MIMO transmission approach 4): Mode 1-2, Mode 2-2 and Mode 3-1;
MIMO transmission approach 5): Mode 3-1;
MIMO transmission approach 6): Mode 1-2, Mode 2-2 and Mode 3-1;
MIMO transmission approach 7): Mode 2-0 and Mode 3-0;
MIMO transmission approach 8): Mode 1-2, Mode 2-2 and Mode 3-1, with PMI/RI feedback from UE; or
Mode 2-0 and Mode 3-0, without PMI/RI feedback from UE.

There are currently few references available for the CSI feedback in the LTE-A system, as this has not been discussed in the standardization process. The only existing documents mainly focus on the general design of the feedback, including:

1) Fundamental principle for designing CSI feedback. The periodic feedback can support at most five downlink carriers and utilizes a design principle similar to that specified in Release 8 so as to be mapped onto one uplink carrier for feedback. In addition, it is necessary to consider how to reduce the feedback overhead and how to increase the payload of the feedback channel. However, this fundamental design principle fails to teach any specific implementation, which is thus still a technical gap to be filled. Reference can be made to 3GPP RAN1, "Final Report of 3GPP TSG RAN WG1#58bis v1.0.0";

2) W1 (pre-coding matrix index #1) and W2 (pre-coding matrix index #2) design schemes. W1 uses a block diagonalization form, wherein a diagonalized block is a DFT matrix or a sub-matrix thereof. W2 is a vector selection matrix with a weighting combination effect. Reference can be made to R1-105011, "Way Forward on 8Tx Codebook for Rel.10 DL MIMO", ALCATEL-LUCENT, et. al;

3) Transmission principles of W1 and W2 on PUCCH. When W1 and W2 are transmitted separately on different sub-frames, W1 is transmitted together with RI in one sub-frame, and they are jointly coded (the total feedback overhead of W1 and RI is no more than 5 bits). When W1 and W2 are transmitted in the same sub-frame, codebooks are down-sampled, so that the total feedback overhead of W1 and W2 is no more than 4 bits. Reference can be made to 3GPP, R1-104234, "Way Forward on CSI Feedback for Rel.10 DL MIMO", Texas Instruments, et. al.

In the approach 3) proposed by Texas Instruments, how to jointly code W1 and RI, how to down-sample the codebooks of W1 and W2, and how to process and feed back RI, W1 and W2 in different MIMO transmission approaches are technical topics which are desired to be solved. Texas Instruments only proposed that the number of bits for joint coding is no more than 5, and the total feedback overhead of the down-sampled W1 and W2 is no more than 4 bits. However, there are no particular design schemes in detail.

SUMMARY OF INVENTION

It is an object of the present invention to solve the problem of insufficient and inoperable feedback for downlink CSI in the prior art by providing a novel method of jointly coding the downlink CSI based on a binary tree.

According to a first aspect of the present invention, a method of jointly coding downlink channel state information CSI based on a binary tree is provided. The method comprises steps of: determining whether Rank Index RI is more than 2; using a first half branch of a coding binary tree to represent joint coding of the RI and W1 when RI=1 and RI=2, if the RI is no more than 2; using a second half branch of the coding binary tree to represent remaining separate codings and/or joint codings when the RI is more than 2, if the RI is more than 2; and outputting processing results of the above coding steps.

Preferably, all or a part of the second half branch of the coding binary tree is used for representing the separate coding of the RI when the RI is more than 2.

More preferably, all of a first half branch of the second half branch of the coding binary tree is used for representing the separate coding of the RI when RI=3 and RI=4.

Preferably, all or a part of the second half branch of the coding binary tree is used for representing the joint coding of the RI and the W1 when RI=3 and RI=4.

More preferably, all of a first half branch of the second half branch of the coding binary tree is used for representing the joint coding of the RI and the W1 when RI=3 and RI=4.

More preferably, all or a part of a second half branch of the second half branch of the coding binary tree is used for representing the separate coding of the RI and/or the joint coding of the RI and the W1 when the RI is more than 4.

Preferably, all of the second half branch of the coding binary tree is used for representing the separate coding of the RI when RI=3 and RI=4.

Preferably, the codebooks of the W1 and/or the W2 are down-sampled before the RI and the W1 are jointly coded. More preferably, when RI=1, only one of the codebooks of the W1 and the W2 is down-sampled.

More preferably, the codebook of the W1 is down-sampled at a first down-sampling rate, and the codebook of the W2 is down-sampled at a second down-sampling rate. More preferably, the first down-sampling rate is equal to the second down-sampling rate; or the first down-sampling rate is more than the second down-sampling rate; or the first down-sampling rate is less than the second down-sampling rate.

Preferably, when physical quantities characterized by codewords in the codebook are same or similar, the codebook is down-sampled uniformly. More preferably, codewords corresponding to equal-interval serial numbers are taken as a down-sampled codebook.

Preferably, when the codewords in the codebook are categories depending on forms and values thereof, only the forms are down-sampled, and all of possible values are retained. More preferably, when the codewords in the codebook are categories depending on forms and values thereof, only the values are down-sampled, and all of possible forms are retained.

Preferably, when the codewords in the codebook are categories depending on forms and values thereof, the forms are down-sampled at a third down-sampling rate, and the values are down-sampled at a fourth down-sampling rate. More preferably, the third down-sampling rate is equal to the fourth down-sampling rate; or the third down-sampling rate is more than the fourth down-sampling rate; or the third down-sampling rate is less than the fourth down-sampling rate.

Preferably, the RI is limited to be less than 5 for a MIMO open-loop space division multiplexing.

Preferably, the RI and the W1 are jointly coded for a MIMO open-loop space division multiplexing.

Preferably, the RI is separately coded for a MIMO open-loop space division multiplexing.

Preferably, the W1 is separately coded for a MIMO closed-loop single layer pre-coding.

Preferably, the RI is limited to be less than 3 for a MIMO two-layer beam forming transmission.

Preferably, only the joint coding of the RI and the W1 is fed back for a MIMO open-loop space division multiplexing, without the feedback of the W2.

Preferably, only the separate coding of the RI is fed back for a MIMO open-loop space division multiplexing, without the feedback of the W1 and the W2.

Preferably, the W2 is selected in the codebook of the W2 according to a fixed rule/pattern or randomly.

Preferably, the W1 is selected in the codebook of the W1 according to a fixed rule/pattern or randomly.

Preferably, the W2 on different time domain resource points and/or different frequency domain resource points are same or different.

Preferably, the W1 and/or W2 on different time domain resource points and/or different frequency domain resource points are same or different.

According to a second aspect of the present invention, a coder based on a binary tree is provided. The coder comprises: a Rank Index RI determination unit, configured for determining whether RI is more than 2; and a coding unit, configured for using a first half branch of a coding binary tree to represent joint coding of the RI and W1 when RI=1 and RI=2, or using a second half branch of the coding binary tree to represent remaining separate codings and/or joint codings when the RI is more than 2, according to a determination result of the Rank Index RI determination unit; and for outputting the coded processing result.

The present invention may be applied to an equal-length coding or an unequal-length coding. The present invention has advantages such as easy implementation, lower signaling overhead etc., and may be suitable for an LTE-A/4G cellular communication system and a future 5G cellular communication system.

BRIEF DESCRIPTION OF DRAWINGS

The above and other objects, features and advantages of the present invention will be more apparent from the following preferred embodiments illustrated with reference to the figures, in which:

FIG. 4 is a flowchart illustrating a CSI feedback method according to the present invention;

FIG. 6 is a schematic diagram of a coder based on a binary tree according to the present invention;

FIG. 13 is a schematic diagram of Example 7 of a joint coding of RI and W1 according to the present invention;

FIG. 14 is a schematic diagram of Example 8 of a joint coding of RI and W1 according to the present invention;

FIG. 15 is a schematic diagram of Example 9 of a joint coding of RI and W1 according to the present invention; and FIG. 16 is a schematic diagram of Example 10 of a joint coding of RI and W1 according to the present invention.

DESCRIPTION OF EMBODIMENTS

Preferred embodiments of the present invention will be detailed with reference to the drawings. In the following description, details and functions unnecessary to the present invention are omitted so as not to obscure the concept of the invention.

For clear and detailed explanation of the implementation steps of the present invention, some specific examples applicable to the LTE-A cellular communication system are given below. Herein, it is to be noted that the present invention is not limited to the application exemplified in the embodiments. Rather, it is applicable to other communication systems, such as the future 5G cellular communication system.

Figure 1:
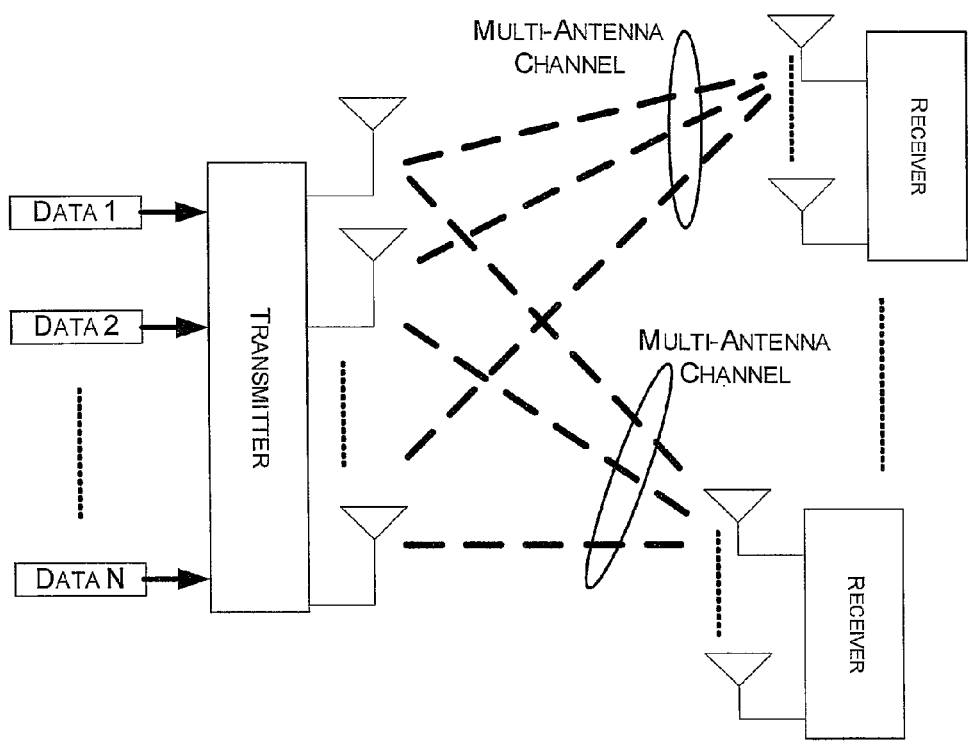
FIG. 1 is a schematic diagram of a MIMO system.
Figure 2:
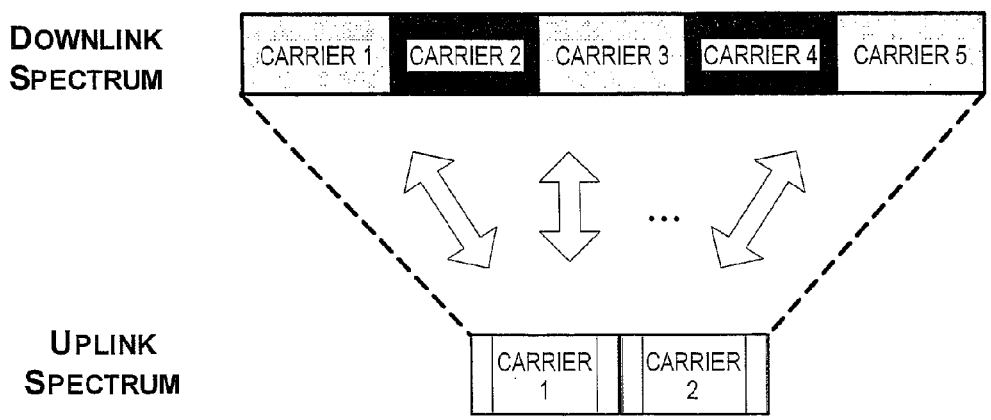
FIG. 2 is a schematic diagram of carrier aggregation.
Figure 3:
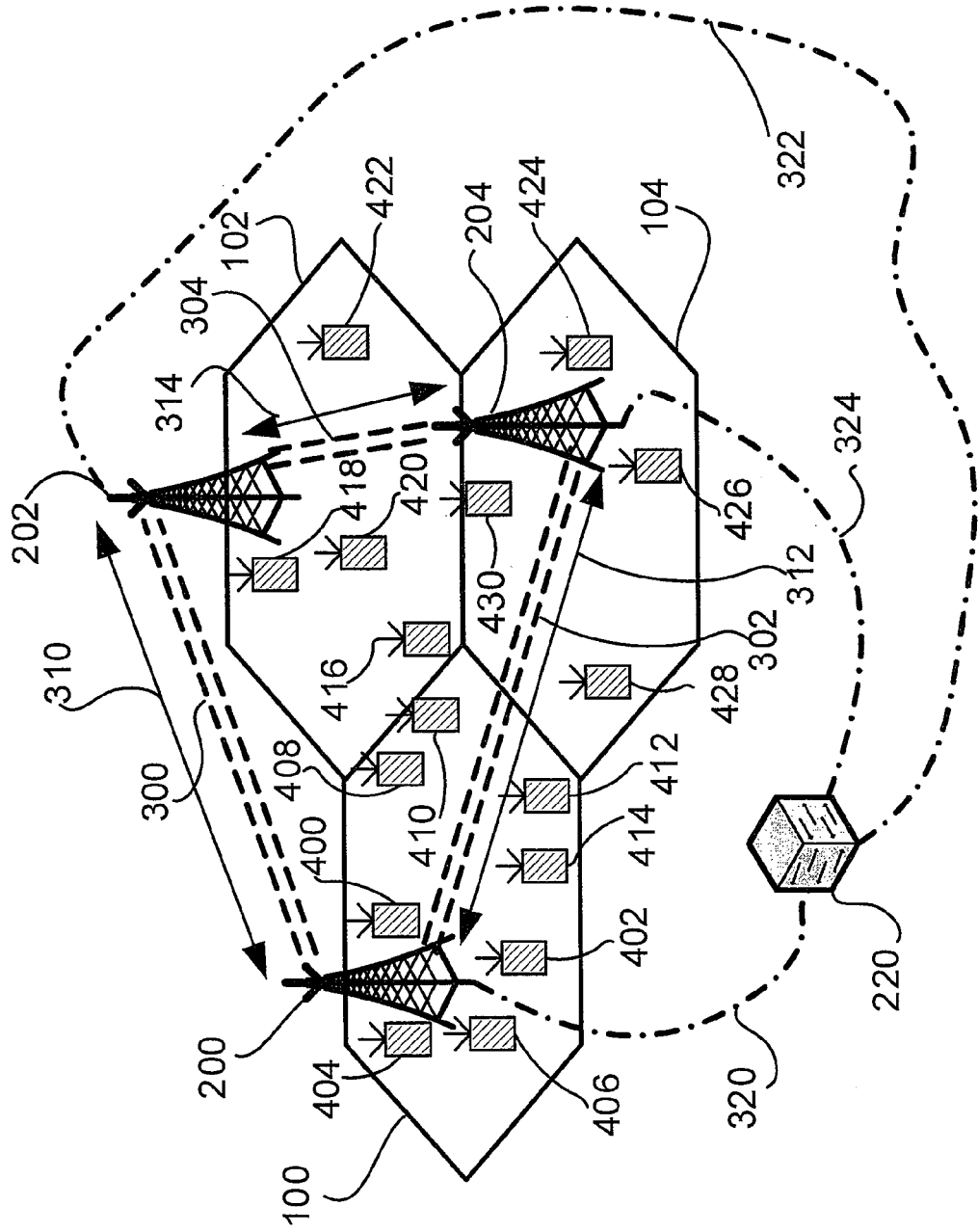
FIG. 3 is a schematic diagram of a multi-cell cellular communication system.

FIG. 3 is a schematic diagram of a multi-cell cellular communication system. The cellular system divides a service coverage area into a number of adjacent wireless coverage areas, i.e., cells. In FIG. 3, the entire service area is formed by cells 100, 102 and 104, each being illustratively shown as a hexagon. Base Stations (BSs) 200, 202 and 204 are associated with the cells 100, 102 and 104, respectively. As known to those skilled in the art, each of the BSs 200-204 comprises at least a transmitter and a receiver. Herein, it is to be noted that a BS, which is generally a serving node in a cell, can be an independent BS having a function of resource scheduling, a transmitting node belonging to an independent BS, a relay node (which is generally configured for further enlarging the coverage of a cell), or the like. As illustratively shown in FIG. 3, each of the BSs 200-204 is located in a particular area of the corresponding one of the cells 100-104 and is equipped with an omni-directional antenna. However, in a cell arrangement for the cellular communication system, each of the BSs 200-204 can also be equipped with a directional antenna for directionally covering a partial area of the corresponding one of the cells 100-104, which is commonly referred to as a sector. Thus, the diagram of the multi-cell cellular communication system as shown in FIG. 3 is illustrative only and does not imply that the implementation of the cellular system according to the present invention is limited to the above particular constraints.

As shown in FIG. 3, the BSs 200-204 are connected with each other via X2 interfaces 300, 302 and 304. In a LTE system, a three-layer node network architecture including base station, radio network control unit and core network is simplified into a two-layer node architecture in which the function of the radio network control unit is assigned to the base station and a wired interface named "X2" is defined for coordination and communication between base stations.

In FIG. 3, the BSs 200-204 are also connected with each other via air interfaces, A1 interfaces, 310, 312 and 314. In a future communication system, it is possible to introduce a concept of relay node. Relay nodes are connected with each other via wireless interfaces and a base station can be considered as a special relay node. Thus, a wireless interface named "A1" can then be used for coordination and communication between base stations.

Additionally, an upper layer entity 220 of the BSs 200-204 is also shown in FIG. 3, which can be a gateway or another network entity such as mobility management entity. The upper layer entity 220 is connected to the BSs 200-204 via S1 interfaces 320, 322 and 324, respectively. In a LTE system, a wired interface named "S1" is defined for coordination and communication between the upper layer entity and the base station.

A number of User Equipments (UEs) 400-430 are distributed over the cells 100-104, as shown in FIG. 3. As known to those skilled in the art, each of the UEs 400-430 comprises a transmitter, a receiver and a mobile terminal control unit. Each of the UEs 400-430 can access the cellular communication system via its serving BS (one of the BSs 200-204). It should be understood that while only 16 UEs are illustratively shown in FIG. 3, there may be a large number of UEs in practice. In this sense, the description of the UEs in FIG. 3 is also for illustrative purpose only. Each of the UEs 400-430 can access the cellular communication network via its serving BS. The BS directly providing communication service to a certain UE is referred to as the serving BS of that UE, while other BSs are referred to non-serving BSs of that UE. The non-serving BSs can function as cooperative BSs of the serving BS and provide communication service to the UE along with the serving BS.

For explanation of this embodiment, the UE 416 equipped with 2 receiving antennas is considered. The UE 416 has BS 202 as its serving BS and has BSs 200 and 204 as its non-serving BSs. It is to be noted that this embodiment focuses on the UE 416, which does not imply that the present invention is only applicable to one UE scenario. Rather, the present invention is fully applicable to multi-UE scenario. For example, the inventive method can be applied to the UEs 408, 410, 430 and the like as shown in FIG. 3.

Moreover, according to 3GPP document TS36.213 V9.1.0, "Physical layer procedures", for a downlink LTE system with a bandwidth of 20 MHz, there are around 96 spectral resource blocks in the frequency domain, in addition to a control signaling area, each of the spectral resource blocks consisting of 12 sub-carriers and 14 OFDM symbols. According to a definition, these spectral resource blocks are sorted in a ascending order in terms of frequency. Every eight consecutive spectral resource blocks are referred to as a sub-band. Thus, there are around 12 sub-bands. It is to be noted that the above definition of sub-band, which is compliant with standardized protocols, is exemplified for explaining the embodiments of the present invention. The application of the present invention is not limited to the above definition and is fully applicable to other definitions. By reading the embodiments of the present invention, those skilled in the art can understand that the solution of the present invention is applicable to a general definition of sub-band.

FIG. 4 is a flowchart illustrating a CSI feedback method according to the present invention.

As shown in FIG. 4, the CSI feedback method according to the present invention comprises the following steps. In step S400, a downlink transmission approach, a feedback mode and feedback resource which are configured by a BS may be received. In step S410, RI and W1 are coded according to the downlink transmission approach and the feedback mode. In step S420, jointly coded CSI of a downlink channel may be fed back to the BS.

Figure 5:
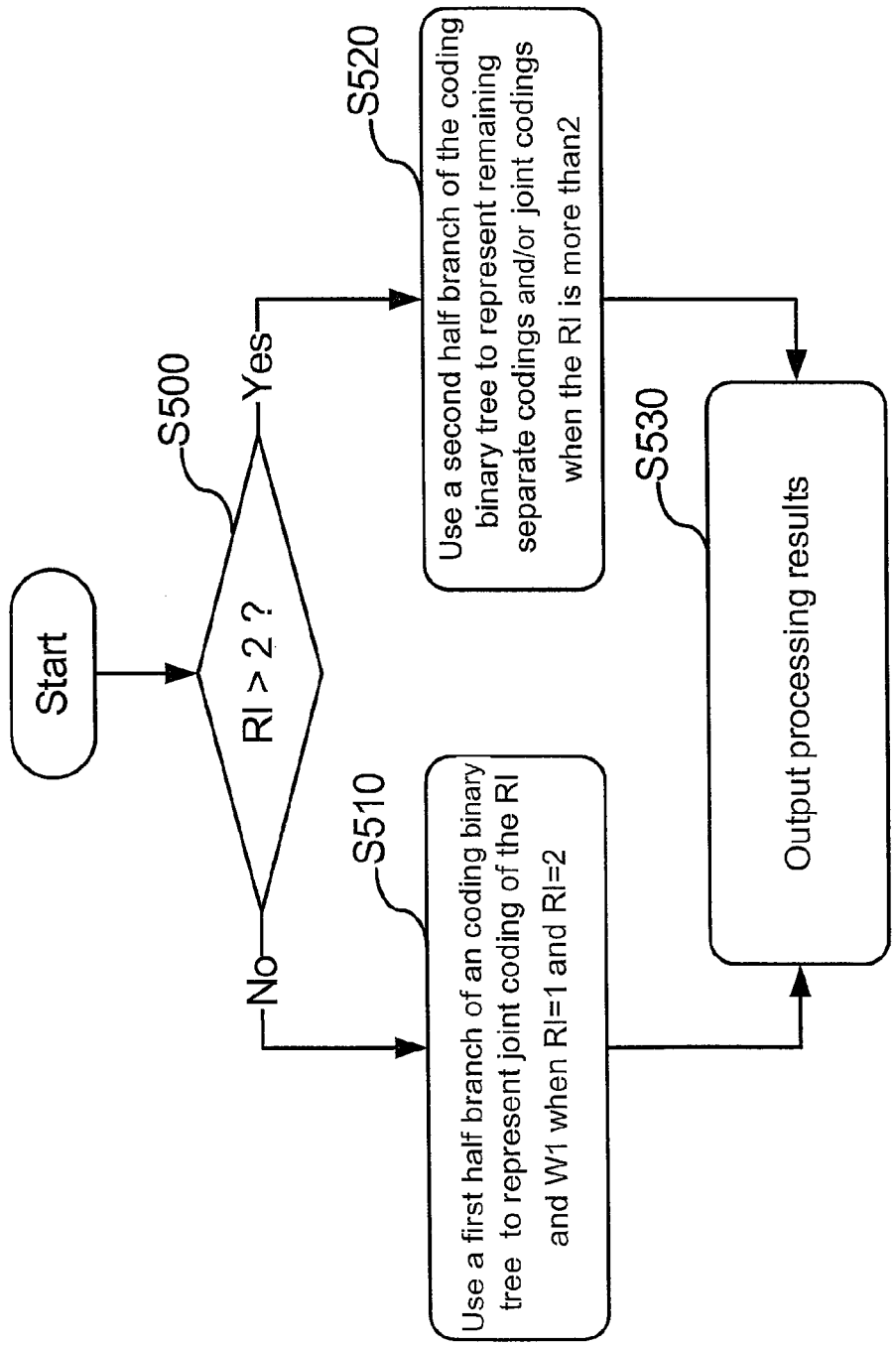
FIG. 5 is a flowchart illustrating a joint coding method based on a binary tree according to the present invention.

FIG. 5 is a flowchart illustrating a joint coding method based on a binary tree according to the present invention.

As shown in FIG. 5, the joint coding method based on the binary tree according to the present invention comprises the following steps. In step S500, it is determined whether RI is more than 2; if the RI is no more than 2 ("No" in step S500), a first half branch of a coding binary tree may be used to represent joint coding of the RI and W1 when RI=1 and RI=2 in step S510; if the RI is more than 2 ("Yes" in step S500), a second half branch of the coding binary tree may be used to represent remaining separate codings and/or joint codings when the RI is more than 2 in step S520. In step S530, processing results of step S510 or S520 may be output.

FIG. 6 is a schematic diagram of a coder based on a binary tree according to the present invention.

As shown in FIG. 6, the coder 600 based on the binary tree according to the present invention comprises a Rank Index RI determination unit 610, configured for determining whether RI is more than 2; and a coding unit 620, configured for using a first half branch of a coding binary tree to represent joint coding of the RI and W1 when RI=1 and RI=2, or using a second half branch of the coding binary tree to represent remaining separate codings and/or joint codings when the RI is more than 2, according to a determination result of the Rank Index RI determination unit; and for outputting the coded processing result.

Hereinafter, ten particular examples are illustrated for the joint coding method and the coder based on the binary tree, so that the skilled in the art may better understand the present invention.

Example 1

Figure 7:
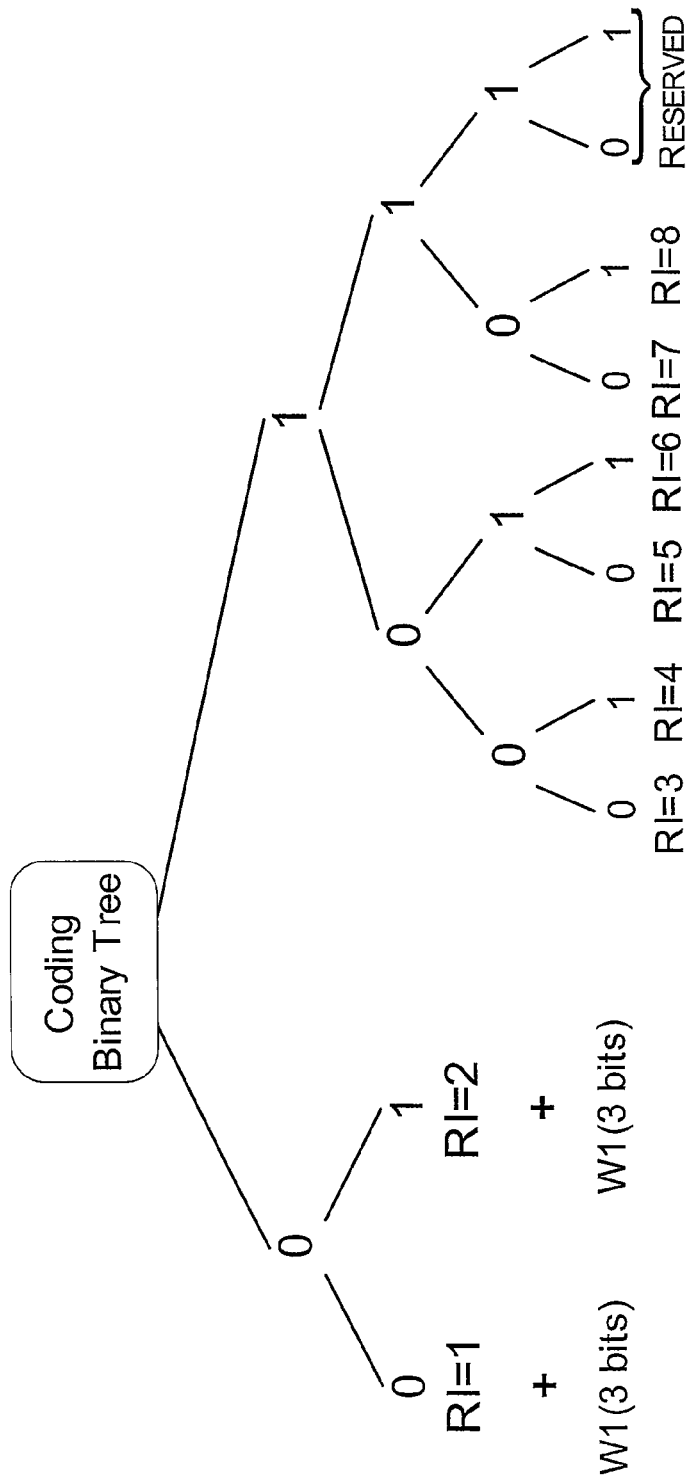
FIG. 7 is a schematic diagram of Example 1 of a joint coding of RI and W1 according to the present invention.

A left half branch or a right half branch (a) of the coding binary tree represents a situation of joint coding of RI and W1 when RI=1 and RI=2; all of leaves in the remaining half branch (b) represent a situation of separate coding of RI when RI is more than 2. Several leaves may be reserved for other uses. A schematic diagram of the present example is shown in FIG. 7. The left half branch of the coding binary tree (state 00xxx, state 01xxx) represents the situation of joint coding of RI and W1 when RI=1 and RI=2, assuming that W1 is coded with 3 bits. The right half branch (state 1000, state 1001, state 1010, state 1011, state 1100, state 1101, state 1110, state 1111) represents the situation of separate coding of RI when RI is more than 2, wherein the state 1110 and the state 1111 are reserved leaves.

In this example, unequal-length coding with a code length of 5 or 4 bits may be used. However, the present invention is not limited to this. Equal-length coding with a code length of 5 bits may also be possible. Here, the last bit of the right half branch may be used for representing other information.

Example 2

Figure 8:
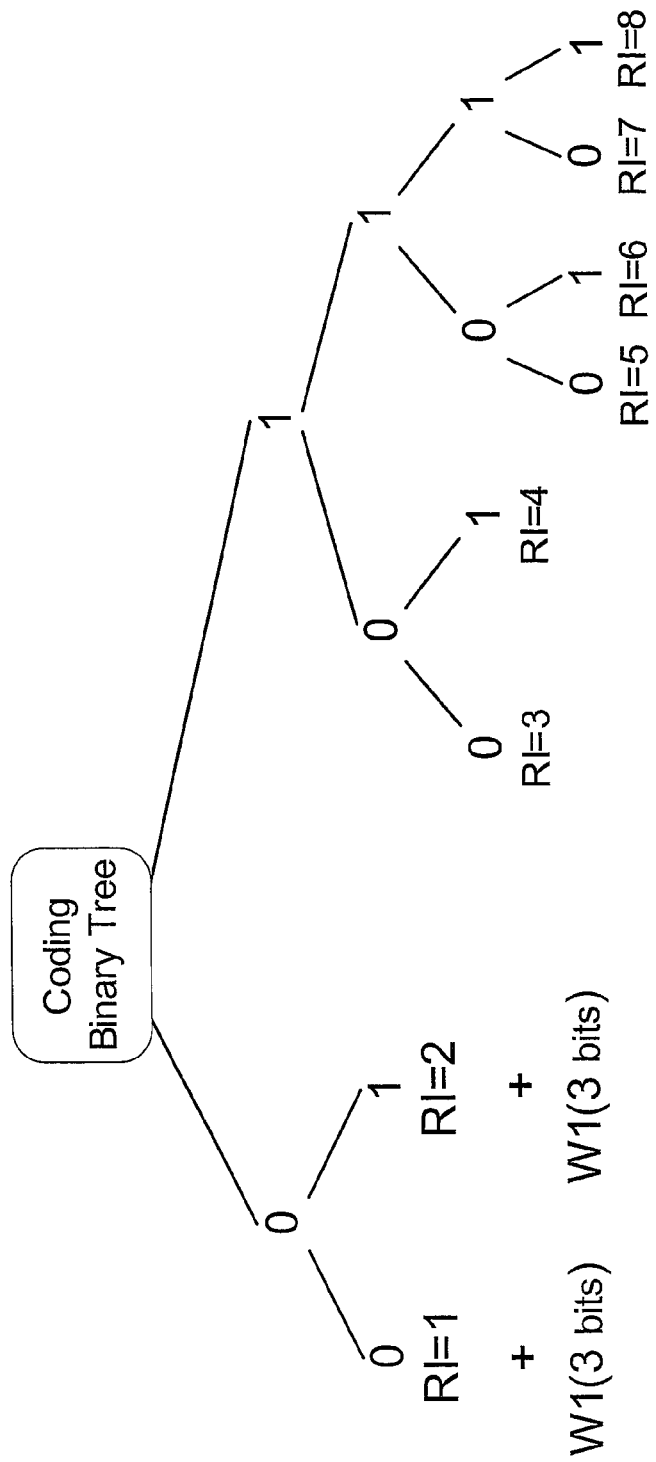
FIG. 8 is a schematic diagram of Example 2 of a joint coding of RI and W1 according to the present invention.

A left half branch or a right half branch (a) of the coding binary tree represents a situation of joint coding of RI and W1 when RI=1 and RI=2; the left half branch or the right half branch (b1) of the remaining half branch (b) represents a situation of separate coding of RI when RI=3 and RI=4; and the remaining half branch (b2) of the half branch (b) represents a situation of separate coding of RI when RI is more than 4. A schematic diagram of the present example is shown in FIG. 8. The left half branch of the coding binary tree (state 00xxx, state 01xxx) represents the situation of joint coding of RI and W1 when RI=1 and RI=2, assuming that W1 is coded with 3 bits. A left half branch of the right half branch (state 100, state 101) represents the situation of separate coding of RI when RI=3 and RI=4; a right half branch of the right half branch (state 1100, state 1101, state 1110, state 1111) represents the situation of separate coding of RI when RI is more than 4.

In this example, unequal-length coding with a code length of 5, 3 or 4 bits may be used. However, the present invention is not limited to this. Equal-length coding with a code length of 5 bits may also be possible. Here, the last two bits of the left half branch of the right half branch and the last bit of the right half branch of the right half branch may be used for representing other information.

Example 3

Figure 9:
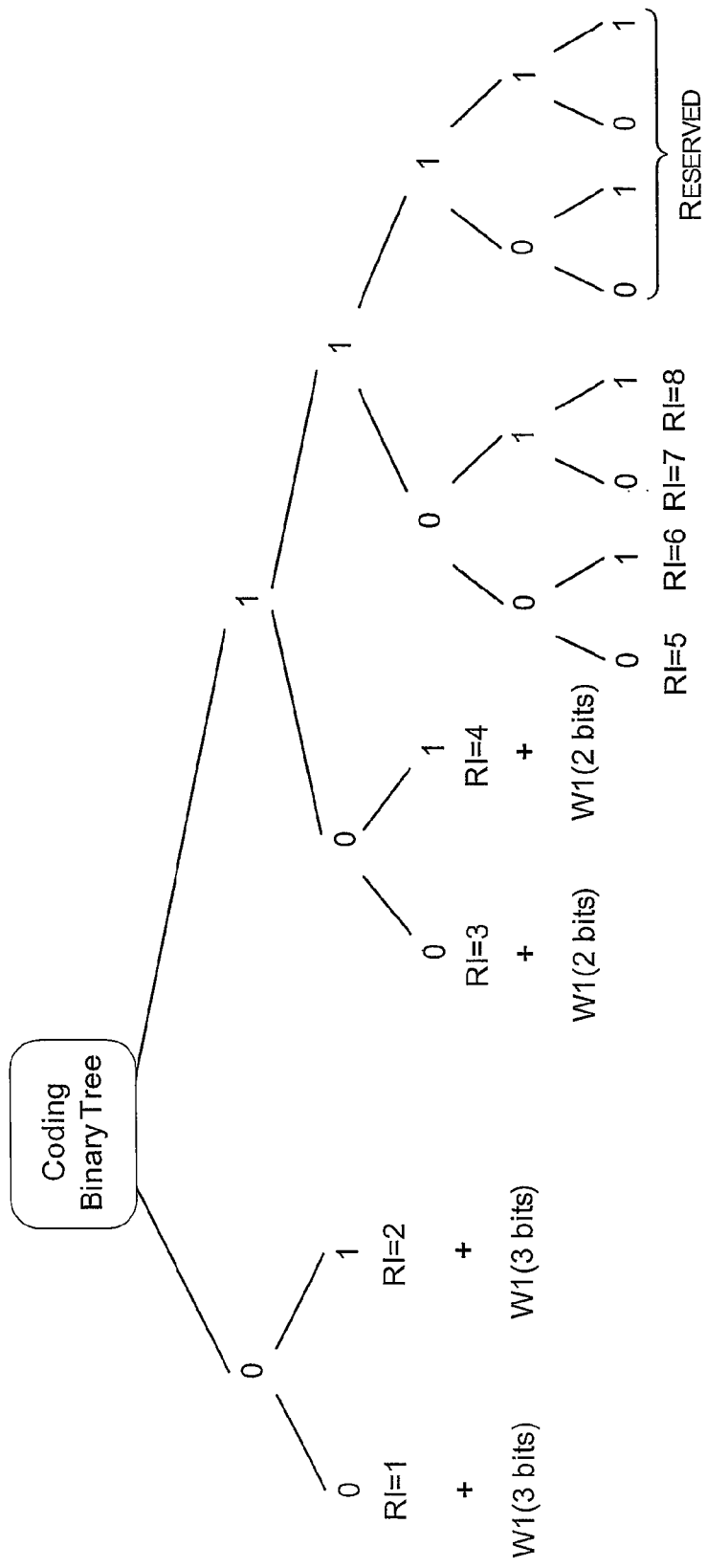
FIG. 9 is a schematic diagram of Example 3 of a joint coding of RI and W1 according to the present invention.

A left half branch or a right half branch (a) of the coding binary tree represents a situation of joint coding of RI and W1 when RI=1 and RI=2; a left half branch or a right half branch (b1) of the remaining half branch (b) represents a situation of joint coding of RI and W1 when RI=3 and RI=4; and the remaining half branch (b2) of the half branch (b) represents a situation of separate coding of RI when RI is more than 4. Several leaves may be reserved for other uses. A schematic diagram of the present example is shown in FIG. 9. The left half branch of the coding binary tree (state 00xxx, state 01xxx) represents the situation of joint coding of RI and W1 when RI=1 and RI=2, assuming that W1 is coded with 3 bits. The left half branch of the right half branch (state 100xx, state 101xx) represents the situation of joint coding of RI and W1 when RI=3 and RI=4, assuming that W1 is coded with 2 bits. The right half branch of the right half branch represents the situation of separate coding of RI when RI is more than 4, wherein state 11100, state 11101, state 11110 and state 11111 are leaves reserved for other uses.

Example 4

Figure 10:
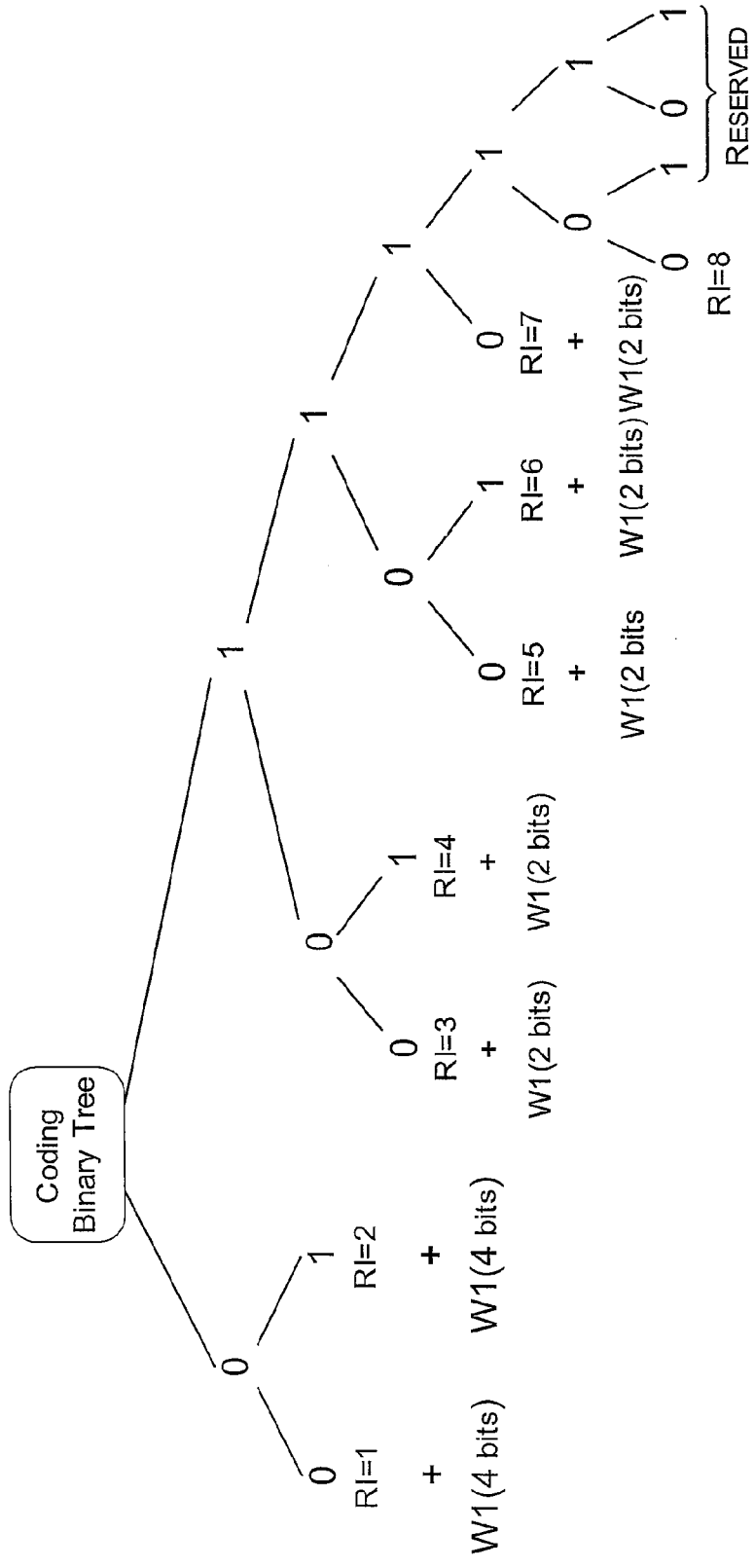
FIG. 10 is a schematic diagram of Example 4 of a joint coding of RI and W1 according to the present invention.

A left half branch or a right half branch (a) of the coding binary tree represents a situation of joint coding of RI and W1 when RI=1 and RI=2; a left half branch or a right half branch (b1) of the remaining half branch (b) represents a situation of joint coding of RI and W1 when RI=3 and RI=4; and the remaining half branch (b2) of the half branch (b) represents a situation of separate coding of RI and/or joint coding of RI and W1 when RI is more than 4. Several leaves may be reserved for other uses. A schematic diagram of the present example is shown in FIG. 10. The left half branch of the coding binary tree (state 00xxxx, state 01xxxx) represents the situation of joint coding of RI and W1 when RI=1 and RI=2, assuming that W1 is coded with 4 bits. The left half branch of the right half branch (state 100xx, state 101xx) represents the situation of joint coding of RI and W1 when RI=3 and RI=4, assuming that W1 is coded with 2 bits. The right half branch of the right half branch represents the situation of separate coding of RI or joint coding of RI and W1 when RI is more than 4, wherein the left half branch of the right half branch of the right half branch (state 1100xx, state 1101xx) represents the situation of joint coding of RI and W1 when RI=5 and RI=6, assuming that W1 is coded with 2 bits; and in the right half branch of the right half branch of the right half branch, state 1110xx represents the situation of joint coding of RI and W1 when RI=7, assuming that W1 is coded with 2 bits; and state 111100 represents the situation of separate coding of RI when RI=8, and other states 111101, state 111110 and state 111111 are leaves reserved for other uses.

In this example, unequal-length coding with a code length of 6 or 5 bits may be used. However, the present invention is not limited to this. Equal-length coding with a code length of 6 bits may also be possible. Here, redundant states may be used for representing other information.

Example 5

Figure 11:
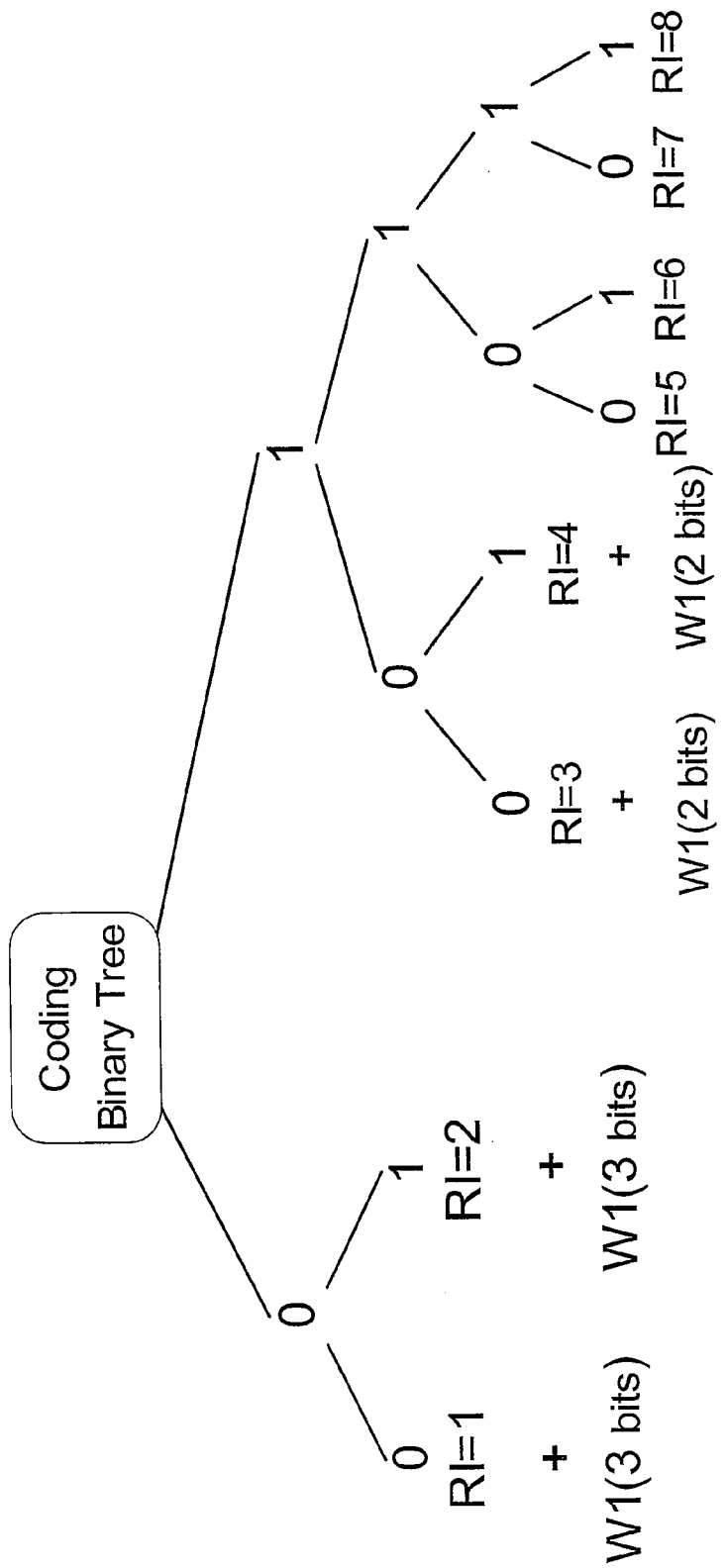
FIG. 11 is a schematic diagram of Example 5 of a joint coding of RI and W1 according to the present invention.

A left half branch or a right half branch (a) of the coding binary tree represents a situation of joint coding of RI and W1 when RI=1 and RI=2; a left half branch or a right half branch (b1) of the remaining half branch (b) represents a situation of joint coding of RI and W1 when RI=3 and RI=4; and the remaining half branch (b2) of the half branch (b) represents a situation of separate coding of RI when RI is more than 4. A schematic diagram of the present example is shown in FIG. 11. The left half branch of the coding binary tree (state 00xxx, state 01xxx) represents the situation of joint coding of RI and W1 when RI=1 and RI=2, assuming that W1 is coded with 3 bits. The left half branch of the right half branch (state 100xx, state 101xx) represents the situation of joint coding of RI and W1 when RI=3 and RI=4, assuming that W1 is coded with 2 bits. The right half branch of the right half branch (state 1100, state 1101, state 1110, state 1111) represents the situation of separate coding of RI when RI is more than 4.

In this example, unequal-length coding with a code length of 5 or 4 bits may be used. However, the present invention is not limited to this. Equal-length coding with a code length of 5 bits may also be possible. Here, the last bit of the right half branch of the right half branch may be used for representing other information.

Example 6

Figure 12:
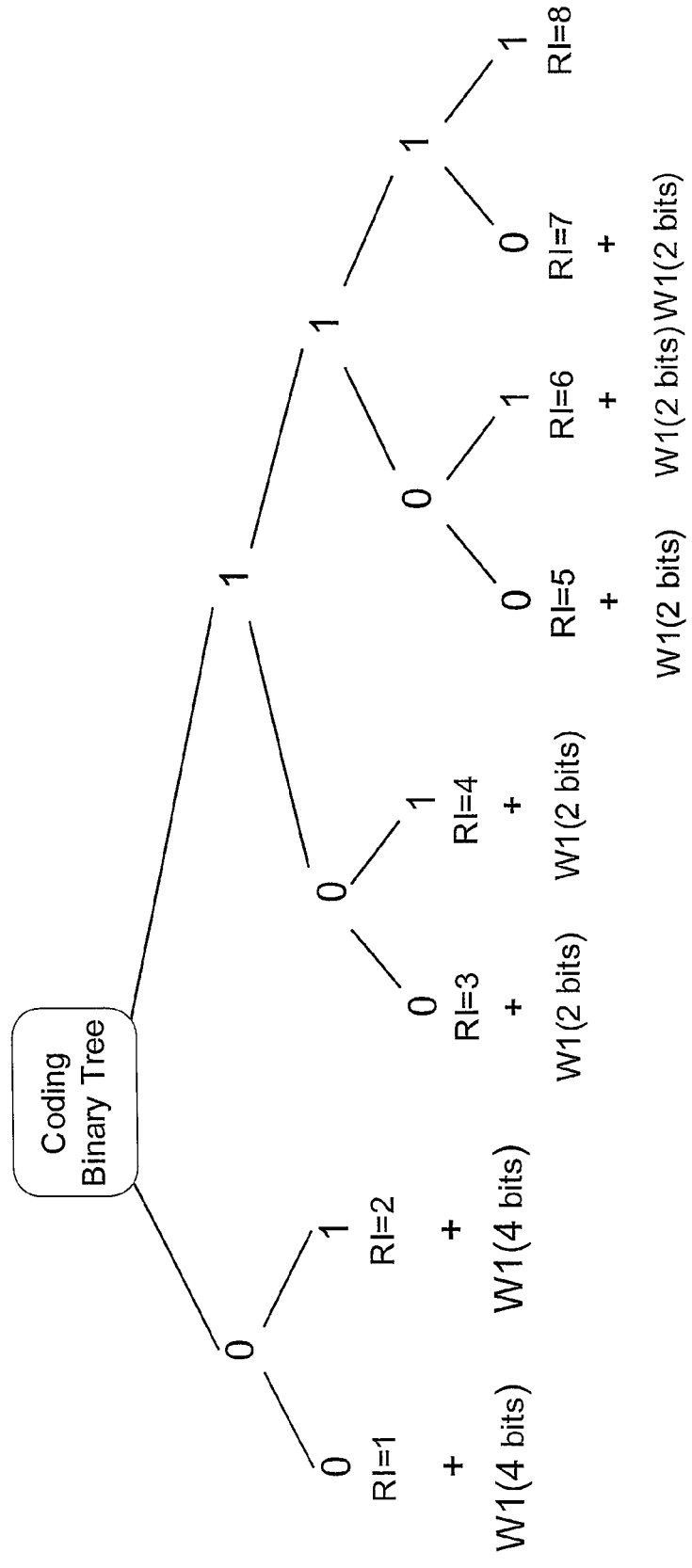
FIG. 12 is a schematic diagram of Example 6 of a joint coding of RI and W1 according to the present invention.

A left half branch or a right half branch (a) of the coding binary tree represents a situation of joint coding of RI and W1 when RI=1 and RI=2; a left half branch or a right half branch (b1) of the remaining half branch (b) represents a situation of joint coding of RI and W1 when RI=3 and RI=4; and the remaining half branch (b2) of the half branch (b) represents a situation of separate coding of RI and/or joint coding of RI and W1 when RI is more than 4. A schematic diagram of the present example is shown in FIG. 12. The left half branch of the coding binary tree (state 00xxxx, state 01xxxx) represents the situation of joint coding of RI and W1 when RI=1 and RI=2, assuming that W1 is coded with 4 bits. The left half branch of the right half branch (state 100xx, state 101xx) represents the situation of joint coding of RI and W1 when RI=3 and RI=4, assuming that W1 is coded with 2 bits. The right half branch of the right half branch represents the situation of separate coding of RI or joint coding of RI and W1 when RI is more than 4, wherein the left half branch of the right half branch of the right half branch (state 1100xx, state 1101xx) represents the situation of joint coding of RI and W1 when RI=5 and RI=6, assuming that W1 is coded with 2 bits; and in the right half branch of the right half branch of the right half branch, state 1110xx represents the situation of joint coding of RI and W1 when RI=7, assuming that W1 is coded with 2 bits; and state 1111 represents the situation of separate coding of RI when RI=8.

In this example, unequal-length coding with a code length of 6, 5 or 4 bits may be used. However, the present invention is not limited to this. Equal-length coding with a code length of 6 bits may also be possible. Here, redundant states may be used for representing other information.

Example 7

A left half branch or a right half branch (a) of the coding binary tree represents a situation of joint coding of RI and W1 when RI=1 and RI=2; all of leaves in the left half branch or the right half branch (b1) of the remaining half branch (b) represent a situation of separate coding of RI when RI=3 and RI=4. The remaining half branch (b2) of the half branch (b) may be reserved for other uses. A schematic diagram of the present example is shown in FIG. 13. The left half branch of the coding binary tree (state 00xxx, state 01xxx) represents the situation of joint coding of RI and W1 when RI=1 and RI=2, assuming that W1 is coded with 3 bits. The left half branch of the right half branch (state 100, state 101) represents the situation of separate coding of RI when RI=3 and RI=4; and the right half branch of the right half branch (state 110, state 111) may be reserved for other uses.

In this example, unequal-length coding with a code length of 5 or 3 bits may be used. However, the present invention is not limited to this. Equal-length coding with a code length of 5 bits may also be possible. Here, the last two bits of the right half branch may be used for representing other information.

Example 8

A left half branch or a right half branch (a) of the coding binary tree represents a situation of joint coding of RI and W1 when RI=1 and RI=2; the remaining half branch (b) represent a situation of separate coding of RI when RI=3 and RI=4. A schematic diagram of the present example is shown in FIG. 14. The left half branch of the coding binary tree (state 00xxx, state 01xxx) represents the situation of joint coding of RI and W1 when RI=1 and RI=2, assuming that W1 is coded with 3 bits. The right half branch (state 10, state 11) represents the situation of separate coding of RI when RI=3 and RI=4.

In this example, unequal-length coding with a code length of 5 or 2 bits may be used. However, the present invention is not limited to this. Equal-length coding with a code length of 5 bits may also be possible. Here, the last three bits of the right half branch may be used for representing other information.

Example 9

A left half branch or a right half branch (a) of the coding binary tree represents a situation of joint coding of RI and W1 when RI=1 and RI=2; a left half branch or a right half branch (b1) of the remaining half branch (b) represent a situation of joint coding of RI and W1 when RI=3 and RI=4; and the remaining half branch (b2) of the half branch (b) is reserved for other uses. A schematic diagram of the present example is shown in FIG. 15. The left half branch of the coding binary tree (state 00xxx, state 01xxx) represents the situation of joint coding of RI and W1 when RI=1 and RI=2, assuming that W1 is coded with 3 bits. The left half branch of the right half branch (state 100xx, state 101xx) represents the situation of joint coding of RI and W1 when RI=3 and RI=4, assuming that W1 is coded with 2 bits. The right half branch of the right half branch (state 11000, state 11001, state 11010, state 11011, state 11100, state 11101, state 11110 and state 11111) may be reserved for other uses.

Example 10

A left half branch or a right half branch (a) of the coding binary tree represents a situation of joint coding of RI and W1 when RI=1 and RI=2; the remaining half branch (b) represent a situation of joint coding of RI and W1 when RI=3 and RI=4. A schematic diagram of the present example is shown in FIG. 16. The left half branch of the coding binary tree (state 00xxx, state 01xxx) represents the situation of joint coding of RI and W1 when RI=1 and RI=2, assuming that W1 is coded with 3 bits. The right half branch (state 10xx, state 11xx) represents the situation of joint coding of RI and W1 when RI=3 and RI=4, assuming that W1 is coded with 2 bits.

In this example, unequal-length coding with a code length of 5 or 4 bits may be used. However, the present invention is not limited to this. Equal-length coding with a code length of 5 bits may also be possible. Here, the last bit of the right half branch may be used for representing other information.

It should be noted that values such as the state codewords concerned in Example 1-Example 10 and the coded bits of W1 are only illustrative for explaining the present invention. The skilled in the art may easily contemplate the method of jointly coding RI and W1 with other values by reading the above embodiments and examples.

Additionally, the codebooks of W1 and W2 may be downsampled before RI and W1 are jointly coded, in order to satisfy requirements for joint coding of RI and W1.

Hereinafter, the present invention will be described using the codebook design of W1 and W2 according to the approach 2) proposed by ALCATEL-LUCENT, et. al, which is described for illustration only. It should be noted that the application of the present invention is not only limited to the codebook design scheme in the approach 2) proposed by ALCATEL-LUCENT, et. al. Other codebook design schemes may be possible. The codebook design scheme proposed by ALCATEL-LUCENT, et. al will be discussed below.

When RI=1, the codebook of W1 contains 16 codewords:

$W_1 \in C_1 = \{W_1^{(0)}, W_1^{(1)}, W_1^{(2)}, \ldots, W_1^{(15)}\};$ the codebook of W2 contains 16 codewords and has four codeword forms:

$$W_2 \in C_2 = \left\{ \frac{1}{\sqrt{2}} \begin{bmatrix} Y \\ Y \end{bmatrix}, \frac{1}{\sqrt{2}} \begin{bmatrix} Y \\ jY \end{bmatrix}, \frac{1}{\sqrt{2}} \begin{bmatrix} Y \\ -Y \end{bmatrix}, \frac{1}{\sqrt{2}} \begin{bmatrix} Y \\ -jY \end{bmatrix} \right\},$$

where each of the codeword forms has four codeword values:

$Y \in \{\tilde{e}_1, \tilde{e}_2, \tilde{e}_3, \tilde{e}_4\}.$

When RI=2, the codebook of W1 contains 16 codewords:

$W_1 \in C_1 = \{W_1^{(1)}, W_1^{(1)}, W_1^{(2)}, \ldots, W_1^{(15)}\};$ the codebook of W2 contains 16 codewords and has two codeword forms:

$$W_2 \in C_2 = \left\{ \frac{1}{\sqrt{2}} \begin{bmatrix} Y_1 & Y_2 \\ Y_1 & -Y_2 \end{bmatrix}, \frac{1}{\sqrt{2}} \begin{bmatrix} Y_1 & Y_2 \\ jY_1 & -jY_2 \end{bmatrix} \right\},$$

where each of the codeword forms has eight codeword values:

$(Y_1, Y_2) \in \{(\tilde{e}_1, \tilde{e}_1), (\tilde{e}_2, \tilde{e}_2), (\tilde{e}_3, \tilde{e}_3), (\tilde{e}_4, \tilde{e}_4), (\tilde{e}_1, \tilde{e}_2), (\tilde{e}_2, \tilde{e}_3),$
$(\tilde{e}_1, \tilde{e}_4), (\tilde{e}_2, \tilde{e}_4)\}.$ When RI=3, the codebook of W1 contains four codewords:

$W_1 \in C_1 = \{W_1^{(0)}, W_1^{(1)}, W_1^{(2)}, W_1^{(3)}\};$ the codebook of W2 contains 16 codewords and has one codeword form:

$$W_2 \in C_2 = \left\{ \frac{1}{\sqrt{2}} \begin{bmatrix} Y_1 & Y_2 \\ Y_1 & -Y_2 \end{bmatrix} \right\},$$

where the codeword form has 16 codeword values:

$$(Y_1, Y_2) \in \left\{ \begin{array}{l} (e_1, [e_1\ e_5]), (e_2, [e_2\ e_6]), (e_3, [e_3\ e_7]), (e_4, [e_4\ e_8]), \\ (e_5, [e_1\ e_5]), (e_6, [e_2\ e_6]), (e_7, [e_3\ e_7]), (e_8, [e_4\ e_8]), \\ ([e_1\ e_5], e_5), ([e_2\ e_6], e_6), ([e_3\ e_7], e_7), ([e_4\ e_8], e_8), \\ ([e_5\ e_1], e_1), ([e_6\ e_2], e_2), ([e_7\ e_3], e_3), ([e_8\ e_4], e_4) \end{array} \right\}.$$

When RI=4, the codebook of W1 contains four codewords:

$W_1 \in C_1 = \{W_1^{(0)}, W_1^{(1)}, W_1^{(2)}, W_1^{(3)}\};$ the codebook of W2 contains eight codewords and has two codeword forms:

$$W_2 \in C_2 = \left\{ \frac{1}{\sqrt{2}} \begin{bmatrix} Y & Y \\ Y & -Y \end{bmatrix}, \frac{1}{\sqrt{2}} \begin{bmatrix} Y & Y \\ jY & -jY \end{bmatrix} \right\},$$

where each of the codeword forms has four codeword values:

$Y \in \{[e_1 e_5], [e_2 e_6], [e_3 e_7], [e_4 e_8]\}.$

When RI=5, the codebook of W1 contains four codewords:

$$W_1 \in C_1 = \left\{ \begin{bmatrix} X^{(0)} & 0 \\ 0 & X^{(0)} \end{bmatrix}, \begin{bmatrix} X^{(1)} & 0 \\ 0 & X^{(1)} \end{bmatrix}, \begin{bmatrix} X^{(2)} & 0 \\ 0 & X^{(2)} \end{bmatrix}, \begin{bmatrix} X^{(3)} & 0 \\ 0 & X^{(3)} \end{bmatrix} \right\},$$

where $$X^{(0)} = \frac{1}{2} \times \begin{bmatrix} 1 & 1 & 1 & 1 \\ 1 & j & -1 & -j \\ 1 & -1 & 1 & -1 \\ 1 & -j & -1 & j \end{bmatrix},$$

$X^{(1)} = \text{diag}\{1, e^{j\pi/4}, j, e^{j3\pi/4}\} X^{(0)}$ $X^{(2)} = \text{diag}\{1, e^{j\pi/8}, e^{j2\pi/8}, e^{j3\pi/8}\} X^{(0)},$ $X^{(3)} = \text{diag}\{1, e^{j3\pi/8}, e^{j6\pi/8}, e^{j9\pi/8}\} X^{(0)};$ the codebook of W2 contains one codeword:

$$W_2 = \frac{1}{\sqrt{2}} \begin{bmatrix} \tilde{e}_1 & \tilde{e}_1 & \tilde{e}_2 & \tilde{e}_2 & \tilde{e}_3 \\ \tilde{e}_1 & -\tilde{e}_1 & \tilde{e}_2 & -\tilde{e}_2 & \tilde{e}_3 \end{bmatrix}.$$

When RI=6, the codebook of W1 contains four codewords:

$$W_1 \in C_1 = \left\{ \begin{bmatrix} X^{(0)} & 0 \\ 0 & X^{(0)} \end{bmatrix}, \begin{bmatrix} X^{(1)} & 0 \\ 0 & X^{(1)} \end{bmatrix}, \begin{bmatrix} X^{(2)} & 0 \\ 0 & X^{(2)} \end{bmatrix}, \begin{bmatrix} X^{(3)} & 0 \\ 0 & X^{(3)} \end{bmatrix} \right\},$$

where $$X^{(0)} = \frac{1}{2} \times \begin{bmatrix} 1 & 1 & 1 & 1 \\ 1 & j & -1 & -j \\ 1 & -1 & 1 & -1 \\ 1 & -j & -1 & j \end{bmatrix},$$

$$X^{(1)} = \mathrm{diag}\{1, e^{j\pi/4}, j, e^{j3\pi/4}\}X^{(0)}$$

$$X^{(2)} = \mathrm{diag}\{1, e^{j\pi/8}, e^{j2\pi/8}, e^{j3\pi/8}\}X^{(0)},$$

$$X^{(3)} = \mathrm{diag}\{1, e^{j3\pi/8}, e^{j6\pi/8}, e^{j9\pi/8}\}X^{(0)};$$

the codebook of W2 contains one codeword:

$$W_2 = \frac{1}{\sqrt{2}} \begin{bmatrix} \tilde{e}_1 & \tilde{e}_1 & \tilde{e}_2 & \tilde{e}_2 & \tilde{e}_3 & \tilde{e}_3 \\ \tilde{e}_1 & -\tilde{e}_1 & \tilde{e}_2 & -\tilde{e}_2 & \tilde{e}_3 & -\tilde{e}_3 \end{bmatrix}.$$

When RI=7, the codebook of W1 contains four codewords:

$$W_1 \in C_1 = \left\{ \begin{bmatrix} X^{(0)} & 0 \\ 0 & X^{(0)} \end{bmatrix}, \begin{bmatrix} X^{(1)} & 0 \\ 0 & X^{(1)} \end{bmatrix}, \begin{bmatrix} X^{(2)} & 0 \\ 0 & X^{(2)} \end{bmatrix}, \begin{bmatrix} X^{(3)} & 0 \\ 0 & X^{(3)} \end{bmatrix} \right\},$$

where $$X^{(0)} = \frac{1}{2} \times \begin{bmatrix} 1 & 1 & 1 & 1 \\ 1 & j & -1 & -j \\ 1 & -1 & 1 & -1 \\ 1 & -j & -1 & j \end{bmatrix},$$

$$X^{(1)} = \mathrm{diag}\{1, e^{j\pi/4}, j, e^{j3\pi/4}\}X^{(0)}$$

$$X^{(2)} = \mathrm{diag}\{1, e^{j\pi/8}, e^{j2\pi/8}, e^{j3\pi/8}\}X^{(0)},$$

$$X^{(3)} = \mathrm{diag}\{1, e^{j3\pi/8}, e^{j6\pi/8}, e^{j9\pi/8}\}X^{(0)};$$

the codebook of W2 contains one codeword:

$$W_2 = \frac{1}{\sqrt{2}} \begin{bmatrix} \tilde{e}_1 & \tilde{e}_1 & \tilde{e}_2 & \tilde{e}_2 & \tilde{e}_3 & \tilde{e}_3 & \tilde{e}_4 \\ \tilde{e}_1 & -\tilde{e}_1 & \tilde{e}_2 & -\tilde{e}_2 & \tilde{e}_3 & -\tilde{e}_3 & \tilde{e}_4 \end{bmatrix}.$$

When RI=8, the codebook of W1 contains one codeword:

$$W_1 \in C_1 = \left\{ \begin{bmatrix} X^{(0)} & 0 \\ 0 & X^{(0)} \end{bmatrix} \right\},$$

where $$X^{(0)} = \frac{1}{2} \times \begin{bmatrix} 1 & 1 & 1 & 1 \\ 1 & j & -1 & -j \\ 1 & -1 & 1 & -1 \\ 1 & -j & -1 & j \end{bmatrix};$$

the codebook of W2 contains one codeword:

$$W_2 = \frac{1}{\sqrt{2}} \begin{bmatrix} \tilde{e}_1 & \tilde{e}_1 & \tilde{e}_2 & \tilde{e}_2 & \tilde{e}_3 & \tilde{e}_3 & \tilde{e}_4 & \tilde{e}_4 \\ \tilde{e}_1 & -\tilde{e}_1 & \tilde{e}_2 & -\tilde{e}_2 & \tilde{e}_3 & -\tilde{e}_3 & \tilde{e}_4 & -\tilde{e}_4 \end{bmatrix}.$$

Example 11

The codebooks of W2 and W1 are down-sampled at the same down-sampling rate. In this example, according to the codebook of RI=1 in the approach 2) as proposed by ALCATEL-LUCENT, et. al, the codebook of W1 contains 16 codewords, and the codebook of W2 contains 16 codewords. Let both of the down-sampling rates of the codebooks of W1 and W2 be 1/2, i.e. taking 8 codewords from the codebook of W1 and taking 8 codewords from the codebook of W2, so as to constitute the down-sampled codebooks of W2 and W1, the number of the combined codewords of W1 and W2 being 64.

Example 12

W2 is down-sampled at a lower down-sampling rate, and W1 is down-sampled at a higher down-sampling rate. In this example, according to the codebook of RI=2 in the approach 2) as proposed by ALCATEL-LUCENT, et. al, the codebook of W1 contains 16 codewords, and the codebook of W2 contains 16 codewords. Let the down-sampling rate of the codebook of W1 be 1/2, i.e. taking 8 codewords from the codebook of W1, and the down-sampling rate of the codebook of W2 be 1/4, i.e. taking 4 codewords from the codebook of W2, so as to constitute the down-sampled codebooks of W2 and W1, the number of the combined codewords of W1 and W2 being 32.

Example 13

W1 is down-sampled at a lower down-sampling rate, and W2 is down-sampled at a higher down-sampling rate. In this example, according to the codebook of RI=2 in the approach 2) as proposed by ALCATEL-LUCENT, et. al, the codebook of W1 contains 16 codewords, and the codebook of W2 contains 16 codewords. Let the down-sampling rate of the codebook of W1 be 1/4, i.e. taking 4 codewords from the codebook of W1, and the down-sampling rate of the codebook of W2 be 1/2, i.e. taking 8 codewords from the codebook of W2, so as to constitute the down-sampled codebooks of W2 and W1, the number of the combined codewords of W1 and W2 being 32.

Example 14

Only W2 is down-sampled, but W1 is not down-sampled. In this example, according to the codebook of RI=4 in the approach 2) as proposed by ALCATEL-LUCENT, et. al, the codebook of W1 contains 4 codewords, and the codebook of W2 contains 8 codewords. W1 is not down-sampled, i.e. retaining all of the 4 codewords in the codebook of W1, and let the down-sampling rate of the codebook of W2 be 1/2, i.e.

taking 4 codewords from the codebook of W2, so as to constitute the down-sampled codebooks of W2 and W1, the number of the combined codewords of W1 and W2 being 16.

Example 15

Only W1 is down-sampled, but W2 is not down-sampled. In this example, according to the codebook of RI=4 in the approach 2) as proposed by ALCATEL-LUCENT, et. al, the codebook of W1 contains 4 codewords, and the codebook of W2 contains 8 codewords. W2 is not down-sampled, i.e. retaining all of the 8 codewords in the codebook of W2, and let the down-sampling rate of the codebook of W1 be 1/2, i.e. taking 2 codewords from the codebook of W1, so as to constitute the down-sampled codebooks of W2 and W1, the number of the combined codewords of W1 and W2 being 16.

Example 16

When RI=1, only W2 is down-sampled, but W1 is not down-sampled. In this example, according to the codebook of RI=1 in the approach 2) as proposed by ALCATEL-LUCENT, et. al, the codebook of W1 contains 16 codewords, and the codebook of W2 contains 16 codewords. Thus, only W2 is down-sampled, but W1 is not down-sampled. For example, the down-sampling rate of the codebook of W2 is 1/2, i.e. taking 8 codewords from the codebook of W2 as the down-sampled codebook of W2.

Example 17

When RI=1, only W1 is down-sampled, but W2 is not down-sampled. In this example, according to the codebook of RI=1 in the approach 2) as proposed by ALCATEL-LUCENT, et. al, the codebook of W1 contains 16 codewords, and the codebook of W2 contains 16 codewords. Thus, only W1 is down-sampled, but W2 is not down-sampled. For example, the down-sampling rate of the codebook of W1 is 1/2, i.e. taking 8 codewords from the codebook of W1 as the down-sampled codebook of W1.

Example 11-Example 17 have discussed whether to down-sample W1 and W2, and how to select the down-sampling rates of W1 and W2. When W1 and/or W2 are needed to be down-sampled, the codebooks may be down-sampled according to examples as listed in Example 18-Example 23.

Example 18

When properties of the codewords, i.e. physical parameters represented by the codewords, in the codebook are same or similar, the codebook may be down-sampled uniformly. In this example, according to the codebook of RI=2 in the approach 2) as proposed by ALCATEL-LUCENT, et. al, the codebook of W1 contains 16 codewords, and the properties of the codewords are the same, which represent space directions of channels. Therefore, the codebook may be down-sampled uniformly. Particularly, the uniformly down-sampling of the codebook indicates that codewords corresponding to equal-interval serial numbers are taken as a down-sampled codebook. In this example, assuming that the down-sampling rate of the codebook of W1 is 1/4, one possible uniform down-sampling method may take No. 0, 4, 8 and 12 W1 codewords.

Example 19

When the codewords in the codebook are categories depending on forms and values, only the forms are down-sampled, and all of possible values are retained. In this example, according to the codebook of RI=1 in the approach 2) as proposed by ALCATEL-LUCENT, et. al, the codebook of W2 contains 16 codewords, which are divided to 4 codeword forms, and each of the codeword forms has 4 values, respectively. Assuming that the down-sampling rate of the codebook of W2 is 1/2, only the forms are down-sampled. For example, the first and third forms may be taken, and all of the possible 4 values for each of the forms in the first and third forms may be used.

Example 20

When the codewords in the codebook are categories depending on forms and values, only the values are down-sampled, and all of possible forms are retained. In this example, according to the codebook of RI=2 in the approach 2) as proposed by ALCATEL-LUCENT, et. al, the codebook of W2 contains 16 codewords, which are divided to 2 codeword forms, and each of the codeword forms has 8 values, respectively. Assuming that the down-sampling rate of the codebook of W2 is 1/2, only the values are down-sampled. For example, the first, third, fifth and seventh values may be taken, and all of the possible 2 forms may be used.

Example 21

When the codewords in the codebook are categories depending on forms and values, the forms are down-sampled at a higher down-sampling rate, and the values are down-sampled at a lower down-sampling rate. In this example, according to the codebook of RI=1 in the approach 2) as proposed by ALCATEL-LUCENT, et. al, the codebook of W2 contains 16 codewords, which are divided to 4 codeword forms, and each of the codeword forms has 4 values, respectively. Assuming that the down-sampling rate of the codebook of W2 is 1/8, the forms are down-sampled at the higher down-sampling rate, and the values are down-sampled at the lower down-sampling rate. For example, the down-sampling rate for the forms is 1/2 (e.g. taking the first and third forms), and the down-sampling rate for the values is 1/4 (e.g. taking the first value).

Example 22

When the codewords in the codebook are categories depending on forms and values, the values are down-sampled at a higher down-sampling rate, and the forms are down-sampled at a lower down-sampling rate. In this example, according to the codebook of RI=1 in the approach 2) as proposed by ALCATEL-LUCENT, et. al, the codebook of W2 contains 16 codewords, which are divided to 4 codeword forms, and each of the codeword forms has 4 values, respectively. Assuming that the down-sampling rate of the codebook of W2 is 1/8, the values are down-sampled at the higher down-sampling rate, and the forms are down-sampled at the lower down-sampling rate. For example, the down-sampling rate for the values is 1/2 (e.g. taking the first and third values), and the down-sampling rate for the forms is 1/4 (e.g. taking the first form).

Example 23

When the codewords in the codebook are categories depending on forms and values, the forms and the values are down-sampled at the same down-sampling rate. In this example, according to the codebook of RI=2 in the approach 2) as proposed by ALCATEL-LUCENT, et. al, the codebook of W2 contains 16 codewords, which are divided to 2 codeword forms, and each of the codeword forms has 8 values, respectively. Assuming that the down-sampling rate of the codebook of W2 is 1/4, the forms and the values are down-sampled at the same down-sampling rate. For example, the down-sampling rate for the forms is 1/2 (e.g. taking the first form), and the down-sampling rate for the values is 1/2 (e.g. taking the first, third, fifth and seventh values).

The method and the coder for jointly coding RI and W1 based on the binary tree proposed in the present invention may be applied to various MIMO transmission approaches (i.e., MIMO transmission approaches 1)-8)) on the PUCCH. Hereinafter, the transmission approaches 3), 6) and 8) may be taken as examples to describe applications of the joint coding method and the coder proposed by the present invention in detail.

Example 24

For the MIMO transmission approach 3), i.e. the open-loop space division multiplexing, the UE only needs to feed back the joint coding of RI and W1, without the feedback of W2. When the BS selects W2, it selects in the codebook of W2 according to the fixed rule or randomly. Also, W2s on different time domain resource points may be different. In this example, reference is made to FIG. 3. Assuming that a size of the codebook of W2 is 16, i.e. W2 may be selected in 16 codewords. The UE 416 may feed the joint coding of RI and W1 back to a serving BS 202. For W2, the BS 202 may select in the codebook of W2 according to the fixed rule/pattern or randomly. W2s on different OFDM symbols may be different.

For W2 selected according to the fixed rule, the following example may be referred to. When RI=1, the codebook of W2 contains 16 codewords which are divided to 4 codeword forms. All or a part of the codeword forms (e.g. the first and third codeword forms) may be selected as an ordered set of the codeword forms. Each of the codeword forms may have 4 values, respectively. All or a part of values (e.g. the first and third values) may be selected as an ordered set of the values. Ordered codewords consisting of the ordered set of the codeword forms and the ordered set of the values may be sequentially used, according to the order of the time domain and/or frequency domain resources.

For W2 selected randomly, the following example may be referred to. When RI=1, the codebook of W2 contains 16 codewords which are divided to 4 codeword forms. All or a part of the codeword forms (e.g. the first and third codeword forms) may be selected as a set of the codeword forms. Each of the codeword forms may have 4 values, respectively. All or a part of values (e.g. the first and third values) may be selected as a set of the values. The codewords consisting of the set of the codeword forms and the set of the values may be randomly used on the time domain and/or frequency domain resources.

Example 25

For the MIMO transmission approach 3), i.e. the open-loop space division multiplexing, the UE only needs to feed back the joint coding of RI and W1, without the feedback of W2. When the BS selects W2, it selects in the codebook of W2 according to the fixed rule or randomly. Also, W2s on different frequency domain resource points may be different. In this example, reference is made to FIG. 3. Assuming that a size of the codebook of W2 is 16, i.e. W2 may be selected in 16 codewords. The UE 416 may feed the joint coding of RI and W1 back to a serving BS 202. For W2, the BS 202 may select in the codebook of W2 according to the fixed rule/pattern or randomly. W2s on different sub-carries may be different.

For W2 selected according to the fixed rule, the following example may be referred to. When RI=1, the codebook of W2 contains 16 codewords which are divided to 4 codeword forms. All or a part of the codeword forms (e.g. the first and third codeword forms) may be selected as an ordered set of the codeword forms. Each of the codeword forms may have 4 values, respectively. All or a part of values (e.g. the first and third values) may be selected as an ordered set of the values. Ordered codewords consisting of the ordered set of the codeword forms and the ordered set of the values may be sequentially used, according to the order of the time domain and/or frequency domain resources.

For W2 selected randomly, the following example may be referred to. When RI=1, the codebook of W2 contains 16 codewords which are divided to 4 codeword forms. All or a part of the codeword forms (e.g. the first and third codeword forms) may be selected as a set of the codeword forms. Each of the codeword forms may have 4 values, respectively. All or a part of values (e.g. the first and third values) may be selected as a set of the values. The codewords consisting of the set of the codeword forms and the set of the values may be randomly used on the time domain and/or frequency domain resources.

Example 26

For the MIMO transmission approach 3), i.e. the open-loop space division multiplexing, the UE only needs to feed back the joint coding of RI and W1, without the feedback of W2. When the BS selects W2, it selects in the codebook of W2 according to the fixed rule or randomly. Also, W2s on different time domain and frequency domain resource points may be different. In this example, reference is made to FIG. 3. Assuming that a size of the codebook of W2 is 16, i.e. W2 may be selected in 16 codewords. The UE 416 may feed the joint coding of RI and W1 back to a serving BS 202. For W2, the BS 202 may select in the codebook of W2 according to the fixed rule/pattern or randomly. W2s on different OFDM symbols and sub-carriers may be different.

For W2 selected according to the fixed rule, the following example may be referred to. When RI=1, the codebook of W2 contains 16 codewords which are divided to 4 codeword forms. All or a part of the codeword forms (e.g. the first and third codeword forms) may be selected as an ordered set of the codeword forms. Each of the codeword forms may have 4 values, respectively. All or a part of values (e.g. the first and third values) may be selected as an ordered set of the values. Ordered codewords consisting of the ordered set of the codeword forms and the ordered set of the values may be sequentially used, according to the order of the time domain and/or frequency domain resources.

For W2 selected randomly, the following example may be referred to. When RI=1, the codebook of W2 contains 16 codewords which are divided to 4 codeword forms. All or a part of the codeword forms (e.g. the first and third codeword forms) may be selected as a set of the codeword forms. Each of the codeword forms may have 4 values, respectively. All or a part of values (e.g. the first and third values) may be selected as a set of the values. The codewords consisting of the set of the codeword forms and the set of the values may be randomly used on the time domain and/or frequency domain resources.

Example 27

For the MIMO transmission approach 3), i.e. the open-loop space division multiplexing, the UE only needs to feed back the separate coding of RI, without the feedback of W1 and W2. For W1, a fixed value or a high layer signaling semi-static configuration way may be used. When the BS selects W2, it selects in the codebook of W2 according to the fixed rule or randomly. Also, W2s on different time domain resource points may be different. In this example, reference is made to FIG. 3. Assuming that a size of the codebook of W2 is 16, i.e. W2 may be selected in 16 codewords. The UE 416 may feed the separate coding of RI back to a serving BS 202, and W1 may be determined with the fixed value or in the high layer signaling semi-static configuration way. For W2, the BS 202 may select in the codebook of W2 according to the fixed rule/pattern or randomly. W2s on different OFDM symbols may be different.

For W2 selected according to the fixed rule, the following example may be referred to. When RI=1, the codebook of W2 contains 16 codewords which are divided to 4 codeword forms. All or a part of the codeword forms (e.g. the first and third codeword forms) may be selected as an ordered set of the codeword forms. Each of the codeword forms may have 4 values, respectively. All or a part of values (e.g. the first and third values) may be selected as an ordered set of the values. Ordered codewords consisting of the ordered set of the codeword forms and the ordered set of the values may be sequentially used, according to the order of the time domain and/or frequency domain resources.

For W2 selected randomly, the following example may be referred to. When RI=1, the codebook of W2 contains 16 codewords which are divided to 4 codeword forms. All or a part of the codeword forms (e.g. the first and third codeword forms) may be selected as a set of the codeword forms. Each of the codeword forms may have 4 values, respectively. All or a part of values (e.g. the first and third values) may be selected as a set of the values. The codewords consisting of the set of the codeword forms and the set of the values may be randomly used on the time domain and/or frequency domain resources.

Example 28

For the MIMO transmission approach 3), i.e. the open-loop space division multiplexing, the UE only needs to feed back the separate coding of RI, without the feedback of W1 and W2. For W1, a fixed value or a high layer signaling semi-static configuration way may be used. When the BS selects W2, it selects in the codebook of W2 according to the fixed rule or randomly. Also, W2s on different frequency domain resource points may be different. In this example, reference is made to FIG. 3. Assuming that a size of the codebook of W2 is 16, i.e. W2 may be selected in 16 codewords. The UE 416 may feed the separate coding of RI back to a serving BS 202, and W1 may be determined with the fixed value or in the high layer signaling semi-static configuration way. For W2, the BS 202 may select in the codebook of W2 according to the fixed rule/pattern or randomly. W2s on different sub-carriers may be different.

For W2 selected according to the fixed rule, the following example may be referred to. When RI=1, the codebook of W2 contains 16 codewords which are divided to 4 codeword forms. All or a part of the codeword forms (e.g. the first and third codeword forms) may be selected as an ordered set of the codeword forms. Each of the codeword forms may have 4 values, respectively. All or a part of values (e.g. the first and third values) may be selected as an ordered set of the values. Ordered codewords consisting of the ordered set of the codeword forms and the ordered set of the values may be sequentially used, according to the order of the time domain and/or frequency domain resources.

For W2 selected randomly, the following example may be referred to. When RI=1, the codebook of W2 contains 16 codewords which are divided to 4 codeword forms. All or a part of the codeword forms (e.g. the first and third codeword forms) may be selected as a set of the codeword forms. Each of the codeword forms may have 4 values, respectively. All or a part of values (e.g. the first and third values) may be selected as a set of the values. The codewords consisting of the set of the codeword forms and the set of the values may be randomly used on the time domain and/or frequency domain resources.

Example 29

For the MIMO transmission approach 3), i.e. the open-loop space division multiplexing, the UE only needs to feed back the separate coding of RI, without the feedback of W1 and W2. For W1, a fixed value or a high layer signaling semi-static configuration way may be used. When the BS selects W2, it selects in the codebook of W2 according to the fixed rule or randomly. Also, W2s on different time domain and frequency domain resource points may be different. In this example, reference is made to FIG. 3. Assuming that a size of the codebook of W2 is 16, i.e. W2 may be selected in 16 codewords. The UE 416 may feed the separate coding of RI back to a serving BS 202, and W1 may be determined with the fixed value or in the high layer signaling semi-static configuration way. For W2, the BS 202 may select in the codebook of W2 according to the fixed rule/pattern or randomly. W2s on different OFDM symbols and sub-carriers may be different.

For W2 selected according to the fixed rule, the following example may be referred to. When RI=1, the codebook of W2 contains 16 codewords which are divided to 4 codeword forms. All or a part of the codeword forms (e.g. the first and third codeword forms) may be selected as an ordered set of the codeword forms. Each of the codeword forms may have 4 values, respectively. All or a part of values (e.g. the first and third values) may be selected as an ordered set of the values. Ordered codewords consisting of the ordered set of the codeword forms and the ordered set of the values may be sequentially used, according to the order of the time domain and/or frequency domain resources.

For W2 selected randomly, the following example may be referred to. When RI=1, the codebook of W2 contains 16 codewords which are divided to 4 codeword forms. All or a part of the codeword forms (e.g. the first and third codeword forms) may be selected as a set of the codeword forms. Each of the codeword forms may have 4 values, respectively. All or a part of values (e.g. the first and third values) may be selected as a set of the values. The codewords consisting of the set of the codeword forms and the set of the values may be randomly used on the time domain and/or frequency domain resources.

Example 30

For the MIMO transmission approach 3), i.e. the open-loop space division multiplexing, the UE only needs to feed back the separate coding of RI, without the feedback of W1 and W2. For W2, a fixed value or a high layer signaling semi-static configuration way may be used. When the BS selects W1, it selects in the codebook of W1 according to the fixed rule or randomly. Also, W1s on different time domain resource points may be different. In this example, reference is made to FIG. 3. Assuming that a size of the codebook of W1 is 8, i.e. W1 may be selected in 8 codewords. The UE 416 may feed the separate coding of RI back to a serving BS 202, and W2 may be determined with the fixed value or in the high layer signaling semi-static configuration way. For W1, the BS 202 may select in the codebook of W1 according to the fixed rule/pattern or randomly. W1s on different OFDM symbols may be different.

For W1 selected according to the fixed rule, the following example may be referred to. When RI=1, the codebook of W1 contains 16 codewords available to be selected. All or a part of the codewords (e.g. the first, third, fifth, seventh, ninth, eleventh, thirteenth and fifteenth codewords) may be selected as an ordered set of the codewords. The codewords in the ordered set may be sequentially used, according to the order of the time domain and/or frequency domain resources.

For W1 selected randomly, the following example may be referred to. When RI=1, the codebook of W1 contains 16 codewords available to be selected. All or a part of the codewords (e.g. the first, third, fifth, seventh, ninth, eleventh, thirteenth and fifteenth codewords) may be selected as a set of the codewords. The codewords in the set may be randomly used on the time domain and/or frequency domain resources.

Example 31

For the MIMO transmission approach 3), i.e. the open-loop space division multiplexing, the UE only needs to feed back the separate coding of RI, without the feedback of W1 and W2. For W2, a fixed value or a high layer signaling semi-static configuration way may be used. When the BS selects W1, it selects in the codebook of W1 according to the fixed rule or randomly. Also, W1s on different frequency domain resource points may be different. In this example, reference is made to FIG. 3. Assuming that a size of the codebook of W1 is 8, i.e. W1 may be selected in 8 codewords. The UE 416 may feed the separate coding of RI back to a serving BS 202, and W2 may be determined with the fixed value or in the high layer signaling semi-static configuration way. For W1, the BS 202 may select in the codebook of W1 according to the fixed rule/pattern or randomly. W1s on different sub-carriers may be different.

For W1 selected according to the fixed rule, the following example may be referred to. When RI=1, the codebook of W1 contains 16 codewords available to be selected. All or a part of the codewords (e.g. the first, third, fifth, seventh, ninth, eleventh, thirteenth and fifteenth codewords) may be selected as an ordered set of the codewords. The codewords in the ordered set may be sequentially used, according to the order of the time domain and/or frequency domain resources.

For W1 selected randomly, the following example may be referred to. When RI=1, the codebook of W1 contains 16 codewords available to be selected. All or a part of the codewords (e.g. the first, third, fifth, seventh, ninth, eleventh, thirteenth and fifteenth codewords) may be selected as a set of the codewords. The codewords in the set may be randomly used on the time domain and/or frequency domain resources.

Example 32

For the MIMO transmission approach 3), i.e. the open-loop space division multiplexing, the UE only needs to feed back the separate coding of RI, without the feedback of W1 and W2. For W2, a fixed value or a high layer signaling semi-static configuration way may be used. When the BS selects W1, it selects in the codebook of W1 according to the fixed rule or randomly. Also, W1s on different time domain and frequency domain resource points may be different. In this example, reference is made to FIG. 3. Assuming that a size of the codebook of W1 is 8, i.e. W1 may be selected in 8 codewords. The UE 416 may feed the separate coding of RI back to a serving BS 202, and W2 may be determined with the fixed value or in the high layer signaling semi-static configuration way. For W1, the BS 202 may select in the codebook of W1 according to the fixed rule/pattern or randomly. W1s on different OFDM symbols and sub-carriers may be different.

For W1 selected according to the fixed rule, the following example may be referred to. When RI=1, the codebook of W1 contains 16 codewords available to be selected. All or a part of the codewords (e.g. the first, third, fifth, seventh, ninth, eleventh, thirteenth and fifteenth codewords) may be selected as an ordered set of the codewords. The codewords in the ordered set may be sequentially used, according to the order of the time domain and/or frequency domain resources.

For W1 selected randomly, the following example may be referred to. When RI=1, the codebook of W1 contains 16 codewords available to be selected. All or a part of the codewords (e.g. the first, third, fifth, seventh, ninth, eleventh, thirteenth and fifteenth codewords) may be selected as a set of the codewords. The codewords in the set may be randomly used on the time domain and/or frequency domain resources.

Example 33

For the MIMO transmission approach 3), i.e. the open-loop space division multiplexing, the UE only needs to feed back the separate coding of RI, without the feedback of W1 and W2. When the BS selects W1, it selects in the codebook of W1 according to the fixed rule/pattern or randomly. Also, W1s on different time domain and frequency domain resource points may be different. When the BS selects W2, it selects in the codebook of W2 according to the fixed rule/pattern or randomly. Also, W2s on different time domain and frequency domain resource points may be different. In this example, reference is made to FIG. 3. Assuming that a size of the codebook of W1 is 8, i.e. W1 may be selected in 8 codewords; and assuming that a size of the codebook of W2 is 16, i.e. W2 may be selected in 16 codewords. The UE 416 may feed the separate coding of RI back to a serving BS 202. For W1, the BS 202 may select in the codebook of W1 according to the fixed rule/pattern or randomly. W1s on different OFDM symbols and sub-carriers may be different. For W2, the BS 202 may select in the codebook of W2 according to the fixed rule/pattern or randomly. W2s on different OFDM symbols and sub-carriers may be different.

For W1 selected according to the fixed rule, the following example may be referred to. When RI=1, the codebook of W1 contains 16 codewords available to be selected. All or a part of the codewords (e.g. the first, third, fifth, seventh, ninth, eleventh, thirteenth and fifteenth codewords) may be selected as an ordered set of the codewords. The codewords in the ordered set may be sequentially used, according to the order of the time domain and/or frequency domain resources.

For W1 selected randomly, the following example may be referred to. When RI=1, the codebook of W1 contains 16 codewords available to be selected. All or a part of the codewords (e.g. the first, third, fifth, seventh, ninth, eleventh, thirteenth and fifteenth codewords) may be selected as a set of the codewords. The codewords in the set may be randomly used on the time domain and/or frequency domain resources.

Example 34

For the MIMO transmission approach 3), i.e. the open-loop space division multiplexing, the UE only needs to feed back the separate coding of RI, without the feedback of W1 and W2. When the BS selects W1, it selects in the codebook of W1 according to the fixed rule/pattern or randomly. Also, W1s on different time domain or frequency domain resource points may be different. When the BS selects W2, it selects in the codebook of W2 according to the fixed rule/pattern or randomly. Also, W2s on different time domain or frequency domain resource points may be different. In this example, reference is made to FIG. 3. Assuming that a size of the codebook of W1 is 8, i.e. W1 may be selected in 8 codewords; and assuming that a size of the codebook of W2 is 16, i.e. W2 may be selected in 16 codewords. The UE 416 may feed the separate coding of RI back to a serving BS 202. For W1, the BS 202 may select in the codebook of W1 according to the fixed rule/pattern or randomly. W1s on different OFDM symbols and sub-carriers may be different. For W2, the BS 202 may select in the codebook of W2 according to the fixed rule/pattern or randomly. W2s on different OFDM symbols and sub-carriers may be different.

For W1 selected according to the fixed rule, the following example may be referred to. When RI=1, the codebook of W1 contains 16 codewords available to be selected. All or a part of the codewords (e.g. the first, third, fifth, seventh, ninth, eleventh, thirteenth and fifteenth codewords) may be selected as an ordered set of the codewords. The codewords in the ordered set may be sequentially used, according to the order of the time domain and/or frequency domain resources.

For W1 selected randomly, the following example may be referred to. When RI=1, the codebook of W1 contains 16 codewords available to be selected. All or a part of the codewords (e.g. the first, third, fifth, seventh, ninth, eleventh, thirteenth and fifteenth codewords) may be selected as a set of the codewords. The codewords in the set may be randomly used on the time domain and/or frequency domain resources.

For W2 selected according to the fixed rule, the following example may be referred to. When RI=1, the codebook of W2 contains 16 codewords which are divided to 4 codeword forms. All or a part of the codeword forms (e.g. the first and third codewords) may be selected as an ordered set of the codeword forms. Each of the codeword forms may have 4 values. All or a part of the values (e.g. the first and third values) may be selected as an ordered set of values. Ordered codewords consisting of the ordered set of the codeword forms and the ordered set of the values may be sequentially used, according to the order of the time domain and/or frequency domain resources.

For W2 selected randomly, the following example may be referred to. When RI=1, the codebook of W2 contains 16 codewords which are divided to 4 codeword forms. All or a part of the codeword forms (e.g. the first and third codeword forms) may be selected as a set of the codeword forms. Each of the codeword forms may have 4 values, respectively. All or a part of values (e.g. the first and third values) may be selected as a set of the values. The codewords consisting of the set of the codeword forms and the set of the values may be randomly used on the time domain and/or frequency domain resources.

In the above Example 24-Example 34, the MIMO transmission approach 3), i.e. the open-loop space division multiplexing, may be used. Since the open-loop space division multiplexing is generally used in a scene of high speed movement of the UE, the value of its RI is small. In this application scene, RI may be further limited to be less than 5. Example 7-Example 10 are suitable for this case. Of course, the limitation (RI<5) is not necessary. No limitation on the value of RI is possible. At this time, Example 1-Example 6 are also suitable for this case.

Example 35

For the MIMO transmission approach 6), i.e. the closed-loop single layer pre-coding, the UE only needs to feed back the separate coding of W1 and to feed back W2 and CQI together. In this example, reference is made to FIG. 3, considering the closed-loop single layer pre-coding. Since RI=1, the UE 416 needs to feed back the separate coding (set as 3 bits) of W1 to a serving BS 202. Additionally, the UE 416 also needs to feed back the joint coding of W2 and CQI to the serving BS 202.

Example 36

For the MIMO transmission approach 6), i.e. the closed-loop single layer pre-coding, W1 may be semi-static configured by high layer signaling. Additionally, W2 and CQI may be fed back together. In this example, reference is made to FIG. 3, considering the closed-loop single layer pre-coding. Since RI=1, the UE 416 does not need to feed back RI to a serving BS 202. The base station 202 may perform the semi-static configuration on W1 of the UE using the high layer signaling. Additionally, the UE 416 also needs to feed back the joint coding of W2 and CQI to the serving BS 202.

Example 37

For the MIMO transmission approach 6), i.e. the closed-loop single layer pre-coding, W1, W2 and CQI may be fed back together. In this example, reference is made to FIG. 3, considering the closed-loop single layer pre-coding. Since RI=1, the UE 416 does not need to feed back RI to a serving BS 202. However, the UE 416 needs to feed back the joint coding of W1, W2 and CQI to the serving BS 202.

Example 38

For the MIMO transmission approach 8), i.e. the two-layer beam forming transmission, RI is limited to be less than 3, which is represented by 1 bit. In this example, RI is limited to be less than 3, considering the two-layer beam forming transmission. Therefore, RI may be represented by 1 bit.

A number of examples have been illustrated in the above description. While the inventor has tried to list the examples in association with each other, it does not imply that it is required for the listed examples to have such correspondence as described. A number of solutions can be achieved by selecting examples having no correspondence as long as the conditions underlying the selected examples do not conflict with each other. Such solutions are encompassed by the scope of the present invention.

The present invention has been described above with reference to the preferred embodiments thereof. It should be understood that various modifications, alternations and additions can be made by those skilled in the art without departing from the spirits and scope of the present invention. Therefore, the scope of the present invention is not limited to the above particular embodiments but only defined by the claims as attached.

The invention claimed is:
1. A user equipment configured to communicate with a base station, the user equipment comprising:
    a generation unit configured to generate information based on a plurality of values of joint coding of a Rank Index RI and a first Precoding Matrix Index W1; and
    a transmission unit configured to transmit the information on a physical uplink control channel, wherein
    the first Precoding Matrix Index W1 and a second Precoding Matrix Index W2 correspond to a precoding matrix, a half of the plurality of values corresponds to the first Precoding Matrix Index W1 and the Rank Index RI of 1 or 2, and a part of the plurality of values except the half of the plurality of values corresponds to the first Precoding Matrix Index W1 and the Rank Index RI of more than 2.

2. The user equipment as set forth in claim 1, wherein the first Precoding Matrix Index W1 is down-sampled from a predetermined codebook.

3. The user equipment as set forth in claim 1, wherein the first Precoding Matrix Index W1 represents a broadband channel characteristic, and the second Precoding Matrix Index W2 represents a sub-band channel characteristic.

4. The user equipment as set forth in claim 1, wherein the first Precoding Matrix Index W1 represents a long-term channel characteristic, and the second Precoding Matrix Index W2 represents a short-term channel characteristic.

5. A base station configured to communicate with a user equipment, the base station comprising:
a reception unit configured to receive information on a physical uplink control channel, the information is generated based on a plurality of values of joint coding of a Rank Index RI and a first Precoding Matrix Index W1, wherein
the first Precoding Matrix Index W1 and a second Precoding Matrix Index W2 correspond to a precoding matrix,
a half of the plurality of values corresponds to the first Precoding Matrix Index W1 and the Rank Index RI of 1 or 2, and
a part of the plurality of values except the half of the plurality of values corresponds to the first Precoding Matrix Index W1 and the Rank Index RI of more than 2.

6. A joint coding method based on a binary tree, the joint coding method comprising:
determining whether Rank Index RI is more than 2;
using a first half branch of a coding binary tree to represent joint coding of the RI and a first Precoding Matrix Index W1 when RI=1 and RI=2, if the RI is no more than 2, the W1 represents broadband/long-term channel characteristics;
using a second half branch of the coding binary tree to represent remaining separate codings and/or joint codings when the RI is more than 2, if the RI is more than 2; and
outputting processing results.

7. The joint coding method according to claim 6, wherein all or a part of the second half branch of the coding binary tree is used for representing the separate coding of the RI when the RI is more than 2.

8. The joint coding method according to claim 6, wherein the codebooks of the W1 and/or a second Precoding Matrix Index W2 are down-sampled before the RI and the W1 are jointly coded, the W2 represents sub-band/short-term channel characteristics.

9. The joint coding method according to claim 8, wherein when physical quantities characterized by codewords in the codebook are same or similar, the codebook is down-sampled uniformly.

10. The joint coding method according to claim 9, wherein codewords corresponding to equal-interval serial numbers are taken as a down-sampled codebook.

11. The joint coding method according to claim 8, wherein the codebook of the W1 is down-sampled at a first down-sampling rate, and the codebook of the W2 is down-sampled at a second down-sampling rate.

12. The joint coding method according to claim 11, wherein
the first down-sampling rate is equal to the second down-sampling rate; or
the first down-sampling rate is more than the second down-sampling rate; or
the first down-sampling rate is less than the second down-sampling rate.

13. A coder based on a binary tree, the coder comprising:
a Rank Index RI determination unit, configured to determine whether RI is more than 2; and
a coding unit, configured to use for using a first half branch of a coding binary tree to represent joint coding of the RI and a first Precoding Matrix Index W1 when RI=1 and RI=2, or use a second half branch of the coding binary tree to represent remaining separate codings and/or joint codings when the RI is more than 2, according to a determination result of the Rank Index RI determination unit; and to output the coded processing result, the W1 represents broadband/long-term channel characteristics.

* * * * *